US011605202B2

(12) United States Patent
    Sousa Dos Santos et al.

(10) Patent No.: US 11,605,202 B2
(45) Date of Patent: Mar. 14, 2023

(54) ROUTE RECOMMENDATION THAT ASSISTS A USER WITH NAVIGATING AND INTERPRETING A VIRTUAL REALITY ENVIRONMENT

(71) Applicant: International Business Machines Corporation, Armonk, NY (US)

(72) Inventors: Wallas Henrique Sousa Dos Santos, Rio de Janeiro (BR); Emilio Ashton Vital Brazil, Rio de Janeiro (BR); Vagner Figueredo de Santana, São Paulo (BR); Marcio Ferreira Moreno, Rio de Janeiro (BR); Renato Fontoura de Gusmao Cerqueira, Barra da Tijuca (BR)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 17/118,985

(22) Filed: Dec. 11, 2020

(65) Prior Publication Data

US 2022/0189120 A1 Jun. 16, 2022

(51) Int. Cl.
    *G06T 19/00* (2011.01)
    *G06N 5/04* (2023.01)
    *G06N 20/00* (2019.01)

(52) U.S. Cl.
    CPC ............ *G06T 19/003* (2013.01); *G06N 5/04* (2013.01); *G06N 20/00* (2019.01); *G06T 2219/004* (2013.01)

(58) Field of Classification Search
    CPC ............ G06T 19/003; G06T 2219/004; G06T 15/00; G06T 19/00; G06T 2207/20081;
    (Continued)

(56) References Cited

U.S. PATENT DOCUMENTS 6,989,841 B2   1/2006   Docherty
9,345,957 B2   5/2016   Geisner et al.
(Continued)

FOREIGN PATENT DOCUMENTS

AU   2013200609 A1   2/2013
CN   201910818 U    7/2011
(Continued)

OTHER PUBLICATIONS

John Hybertsen, Statoil Testing Virtual Reality on Real Seismic Data, Offshore-mag.com; Geosciences; May 1, 1998, Equinor ASA (formerly Statoil), 11 pages.

*Primary Examiner* — Xilin Guo
(74) *Attorney, Agent, or Firm* — Cantor Colburn LLP; Joseph Petrokaitis

(57) ABSTRACT

Embodiments of the invention are directed to a computer-implemented method of generating a pathway recommendation. The computer-implemented method includes using a processor system to generate an intermediate three-dimensional (3D) virtual reality (VR) environment of a target environment. A machine learning algorithm is used to perform a machine learning task on the intermediate 3D VR environment to generate machine learning task results including predicted features of interest (FOI) and FOI annotations for the intermediate 3D VR environment. The processor system is used to generate, based at least in part on the machine learning task results, the pathway recommendation configured to assist a user with navigating and interpreting a 3D VR environment including the intermediate 3D VR environment having the pathway recommendation.

20 Claims, 17 Drawing Sheets

(58) Field of Classification Search
CPC ...... G06N 20/00; G06N 5/04; G06F 3/04815;
G06F 3/0346; G06F 3/167; G06F 16/444;
G06F 3/011; G06F 3/013; H04L 67/306;
G06V 10/25; G06V 10/22
See application file for complete search history.

(56) References Cited

U.S. PATENT DOCUMENTS

| | | | |
|---|---|---|---|
| 9,417,691 | B2 | 8/2016 | Belimpasakis et al. |
| 9,998,790 | B1 | 6/2018 | Logan et al. |
| 10,601,950 | B2 | 3/2020 | Devam et al. |
| 10,621,762 | B2 | 4/2020 | Donalek et al. |
| 11,158,126 | B1 * | 10/2021 | Petrov .................... G06F 3/012 |
| 2004/0032410 | A1 * | 2/2004 | Ryan ....................... G06T 15/20 |
| | | | 345/473 |
| 2006/0025897 | A1 | 2/2006 | Shostak et al. |
| 2008/0086240 | A1 | 4/2008 | Breed |
| 2013/0198669 | A1 | 8/2013 | Gao et al. |
| 2015/0025788 | A1 | 1/2015 | Crain et al. |
| 2016/0238725 | A1 | 8/2016 | Jones et al. |
| 2018/0374276 | A1 | 12/2018 | Powers et al. |
| 2019/0037133 | A1 * | 1/2019 | Schuett ................... G06F 3/14 |
| 2021/0213940 | A1 * | 7/2021 | Zhang ................. B60W 60/001 |
| 2021/0241035 | A1 * | 8/2021 | Sutherland ........... G06K 9/6253 |

FOREIGN PATENT DOCUMENTS

| | | |
|---|---|---|
| CN | 102681012 A | 9/2012 |
| CN | 103290805 A | 9/2013 |
| CN | 107847289 A | 3/2018 |
| KR | 20150136083 A | 12/2015 |
| WO | 2000014574 A1 | 3/2000 |
| WO | 2014140720 A1 | 9/2014 |
| WO | 2016168617 A1 | 10/2016 |
| WO | 2017066679 A1 | 4/2017 |

\* cited by examiner

US 11,605,202 B2

ROUTE RECOMMENDATION THAT ASSISTS A USER WITH NAVIGATING AND INTERPRETING A VIRTUAL REALITY ENVIRONMENT

BACKGROUND

The present invention relates in general to programmable computers. More specifically, the present invention relates to computing systems, computer-implemented methods, and computer program products configured and arranged to generate personalized route recommendations that assist a person with navigating and interpreting a three-dimensional (3D) virtual reality (VR) environment in order to perform a task.

An immersive VR system is a computer system configured to generate immersive three-dimensional (3D) VR environments that model a corresponding actual environment. The immersive 3D VR environment is configured and arranged to deliver sensory impressions to the human senses (sight, sound, touch, smell, and the like) that mimic the sensory impressions that would be delivered to the human senses by the corresponding actual environment. The basic components of a VR system can include a head-mounted device (HMD) worn by a user; a computing system; and various feedback components that provide inputs from the user to the computing system. The type and quality of these sensory impressions determine the level of immersion and the feeling of presence in the VR system. The HMD displays to the user immersive visual information within the user's field of view. Other outputs provided by the HMD can include audio output and/or haptic feedback. The user can further interact with the HMD by providing inputs for processing by one or more components of the HMD. For example, the user can provide tactile inputs, voice commands, and other inputs while the HMD is mounted to the user's head. Examples of actual environments that can be modeled by an immersive 3D VR environment include a human; an animal; invertebrates; a subterranean environment; and/or an aqueous environment such as an ocean, a lake, a stream, and/or a pond.

SUMMARY

Embodiments of the invention are directed to a computer-implemented method of generating a pathway recommendation. The computer-implemented method includes using a processor system to generate an intermediate three-dimensional (3D) virtual reality (VR) environment of a target environment. A machine learning algorithm is used to perform a machine learning task on the intermediate 3D VR environment to generate machine learning task results including predicted features of interest (FOI) and FOI annotations for the intermediate 3D VR environment. The processor system is used to generate, based at least in part on the machine learning task results, the pathway recommendation configured to assist a user with navigating and interpreting a 3D VR environment including the intermediate 3D VR environment having the pathway recommendation.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
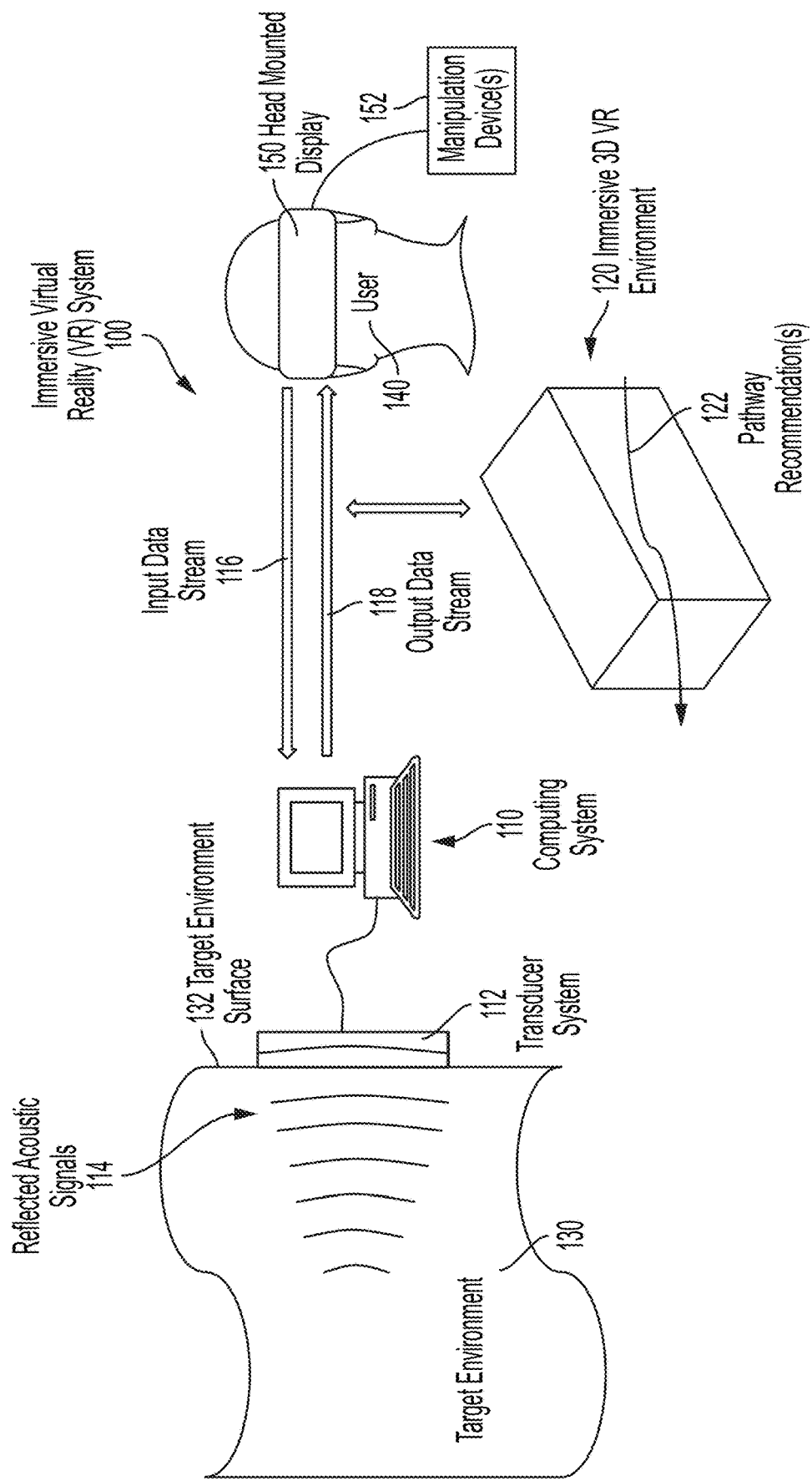
FIG. 1 depicts a block diagram illustrating a system according to embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

As used herein, the terms "immersive virtual reality" system and variations thereof are intended to define a computer system that delivers sensory impressions to the human senses (sight, sound, touch, smell, and the like) that mimic the three-dimensional (3D) sensory impressions that would be delivered to the human senses by an actual 3D environment. The basic components of an immersive VR system can include a head-mounted device (HMD) worn by a user; a computing system; and various feedback components that provide inputs from the user to the computing system.

As used herein, in the context of machine learning algorithms, the terms "input data" and variations thereof are intended to cover any type of data or other information that is received at and used by the machine learning algorithm to perform training, learning, classification operations, and/or tasks.

As used herein, in the context of machine learning algorithms, the terms "training data" and variations thereof are intended to cover any type of data or other information that is received at and used by the machine learning algorithm to perform training and/or learning operations.

As used herein, in the context of machine learning algorithms, the terms "application data," "real world data," "actual data," and variations thereof are intended to cover any type of data or other information that is received at and used by the machine learning algorithm to perform classification operations and/or tasks.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Many of the functional units of the systems described in this specification have been labeled as models. Embodiments of the invention apply to a wide variety of model implementations. For example, the models described herein can be implemented by machine learning algorithms and natural language processing algorithms configured and arranged to uncover unknown relationships between data/information and generate a model that applies the uncovered relationship to new data/information in order to perform an assigned task of the model. In aspects of the invention, the models described herein can have all of the features and functionality of the models depicted in FIGS. 9 and 10 and described in greater detail subsequently herein.

The various components, modules, models, algorithms, and the like of the systems illustrated herein are depicted separately for ease of illustration and explanation. In embodiments of the invention, the functions performed by the various components, modules, models, algorithms, and the like of the systems illustrated herein can be distributed differently than shown without departing from the scope of the embodiments of the invention unless it is specifically stated otherwise.

Turning now to an overview of technologies that are relevant to aspects of the invention, computer models of actual systems or environments can be used to provide a convenient way of analyzing aspects of the actual system/environment by analyzing the computer model of the actual system/environment. One area where computer models can be useful is in seismic interpretation of subterranean regions. Geoscientists use seismic surveys, which are "ultra-sound" images of the underground, to look for geological features that can be evidences to their theories about the subterranean region. The task of interpreting seismic surveys and other seismic information is challenging, cognitively intensive, and time consuming for a variety of reasons. For example, the expected geological features can be completely unknown; the data is a 3D volume which may contains billion of voxels and can cover thousands of kilometers; the interpretation can take from months to years; and the spatial-relationship between the features is key to understanding the subterranean region.

Turning now to an overview of aspects of the invention, embodiments of the invention provide computing systems, computer-implemented methods, and computer program products configured and arranged to generate personalized route recommendations that are integrated within a three-dimensional (3D) virtual reality (VR) environment of a target environment, and that assist a user with navigating and interpreting the 3D VR environment of the target environment in order to perform a user task. In embodiments of the invention, a machine learning algorithm is trained to perform the task of predicting features of interest (FOI) and explanatory annotations of the FOI for a 3D VR environment. The system takes the predicted FOI and the FOI annotations generated by the machine learning algorithms, along with the user task and user profile data, and generates a novel 3D VR environment having the personalized route recommendations that assist the user with navigating and interpreting the novel 3D VR environment in order to perform the user task.

In embodiments of the invention, the machine learning algorithms can be trained by using a historical target environment analysis corpus and/or user feedback data. In embodiments of the invention, the historical target environment analysis corpus can include a wide variety of information from relevant prior analyses performed by trained interpreters (e.g., a geological scientist) on relevant prior target environments in order to complete one or more prior user tasks, including, for example, the task of finding underground reservoirs of oil or natural gas within the prior target environments and/or supporting already-discovered underground reservoirs of oil or natural gas within the prior target environments. For example, in some embodiments of the invention, the historical target environment analysis corpus can include recorded data and analyses generated by a trained interpreter such as seismic measurements; graphs; charts; written notes; written reports; descriptions of the supporting tools and techniques used in the prior analyses; explanations of successful analysis techniques; explanations of unsuccessful analysis techniques; explanations of geological patterns that contributed to successfully completing the task; explanations of geological patterns that did not contribute to successfully completing the task; and the like.

In embodiments of the invention, the user feedback data is feedback the system receives from the user about the pathway recommendation(s) when the user is being guided through the novel 3D VR environment by the pathway recommendation(s). In accordance with aspects of the invention, the user feedback data includes information that conveys how well a given pathway recommendation is performing. For example, the user feedback data can include the user's agreement and/or disagreement with some aspect of the pathway recommendation(s), along with the user's rationale for the agreement and/or disagreement. In some embodiments of the invention, the user's rationale for the agreement and/or disagreement with some aspect of the pathway recommendation(s) can be in the form of spoken natural language, and the novel 3D VR environment can include suitable voice-to-text circuitry to convert the user's spoken natural language feedback to text that functions at the user feedback data.

Turning now to a more detailed description of the aspects of the present invention, FIG. 1 depicts a diagram illustrating an immersive virtual reality (VR) system 100 according to embodiments of the invention. In embodiments of the invention, the system 100 includes a programmable computer 110, a transducer system 112, an HMD 150, and a manipulation device 152 (e.g., a three-dimensional mouse, data gloves, etc.), configured and arranged as shown. The HMD 150 is configured to be worn by a user 140, and the manipulation device(s) 152 are configured to be worn by and/or otherwise controlled/used by the user 140. The computing system 110 is in wired and/or wireless communication with the transducer system 112 and the HMD 150. The HMD 150 is in wired and/or wireless communication with the manipulation device(s) 152.

In aspects of the invention, the transducer system 112 can be positioned on, above, and/or below the target environment surface 132 and configured to send any one of a variety of forms of acoustic energy into a target environment 130. The target environment 130 can be any environment that is partially transparent to acoustic signals and able to reflect at least some of the acoustic signals back to the transducer system 112. In accordance with aspects of the invention, the target environment 130 can include but is not limited to a human; an animal; invertebrates; a subterranean environment; and/or an aqueous environment such as an ocean, a lake, a stream, and/or a pond. In some embodiments of the invention, the transducer system 112 can be a network of individual transducers. In some embodiments of the invention, each individual transducer system 112 in the network can be configured to both transmit and receive acoustic signals. In some embodiments of the invention, each individual transducer system 112 in the network can be implemented as a separate transmission component and a separate receiver component. In some embodiments of the invention, the acoustic signals transmitted and/or received by the transducer system 112 can be any type of acoustic signal including, for example, ultrasonic acoustic signals and/or seismic acoustic signals.

The acoustic energy transmitted into the target environment 130 is reflected from the various elements that make up the target environment 130 and returned to the transducer system 112 as reflected acoustic energy 114. The transducer system 112 captures the reflected acoustic energy 114 and provides it to the computing system 110. The computing system 110 executes software algorithms configured and arranged to use the acoustic signals 114 and an input data stream 116 received from the HMD 150 to generate the output data stream 118 and provide it to the HMD 150. In accordance with embodiments of the invention, the output data stream 118 includes a three-dimensional (3D) VR environment 120 that is a computer-generated 3D model of the target environment 130. Immersive (i.e., 3D) views of the 3D VR environment 120 can be displayed to the user 140 on a display (e.g., display 206 shown in FIG. 2) of the HMD 150, which places tiny screens and lenses close to the user's eyes to simulate large screens that encompass most of the user's field of view. As the user 140 performs actions like walking, head rotating (i.e., changing the point of view), data describing behavior of the user 140 is fed through the input data stream 116 to the computing system 110 from the HMD 150 and/or the manipulation devices 152. The computing system 110 processes the information in real-time and generates appropriate feedback that is passed back to the user 140 by means of the output data stream 118.

In accordance with aspects of the invention, algorithms of the computing system 110 are configured to generate the personalized pathway recommendation(s) 122 and integrate the same with the 3D VR environment 120. In accordance with aspects of the invention, the pathway recommendation(s) 122 function as a guide for assisting the user 140 with traversing the 3D VR environment 120 in a manner that assists the user 140 with visualizing and interpreting important features of the 3D VR environment 120 in order to perform a particular user task. In embodiments of the invention, the user 140 can be an expert on some aspect of the target environment 130, and the user task can be gaining a better understanding of the features of the target environment 130. In accordance with aspects of the invention, the computing system 110 can be configured to include machine learning algorithms that analyze the 3D VR environment 120 to identify the points of interest in the environment 130 that are relevant to the user task. In some embodiments of the invention, the pathway recommendation(s) 122 are personalized for the user 140 and for the task being performed by the user 140. In embodiments of the invention, the pathway recommendation(s) 122 can further include selections of the appropriate scale and orientation of each point of interest that are appropriate for the user 140 and the user task. Embodiments of the invention generate the pathway recommendations 122 and track/store what the user 140 views while navigating the pathway recommendations 122 through the 3D VR environment 120, thereby providing a provenance of data that can be used by the computing system 110 to dynamically update the pathway recommendation(s), thereby providing dynamically updated insights and annotations to the user 140. Additional details of how the computing system 110 can generate the 3D VR environment 120 and the pathway recommendation(s) 122 in accordance with aspects of the invention are depicted in FIGS. 3C and 5-11 and described in greater detail subsequently herein.

Figure 2:
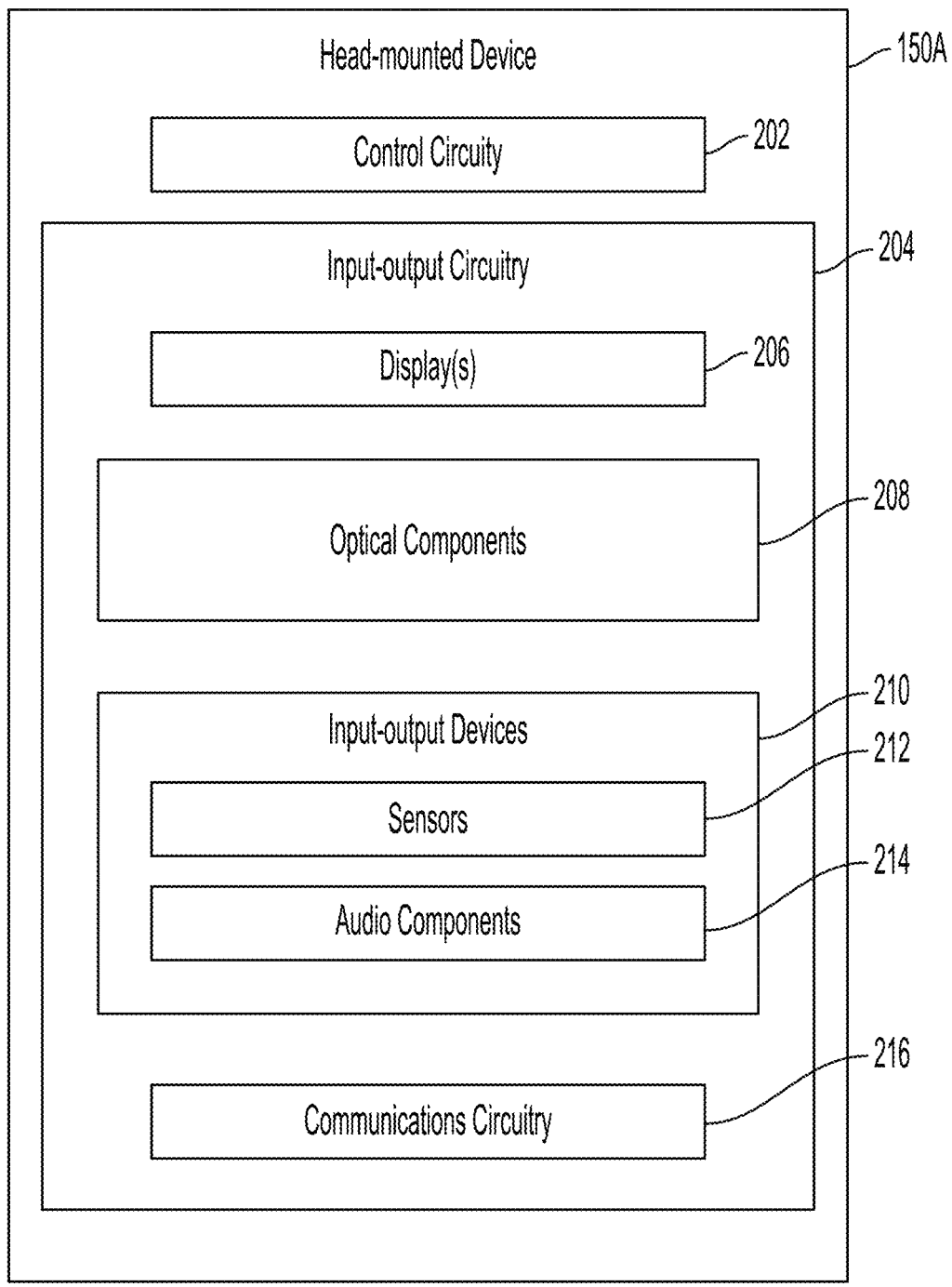
FIG. 2 depicts a block diagram illustrating a system according to embodiments of the invention.

FIG. 2 depicts an HMD 150A, which is a non-limiting example of how the HMD 150 (shown in FIG. 1) can be implemented. In accordance with aspects of the invention, the HMD 150A includes control circuitry 202 and input-output circuitry 204, configured and arranged as shown. The input-output circuitry 204 includes displays 206, optical components 208, input-output devices 210, and communications circuitry 218, configured and arranged as shown. The input-output devices 210 include sensors 212 and audio components 214, configured and arranged as shown. The various components of the HMD 150A can be supported by a head-mountable support structure such as a pair of glasses;

a helmet; a pair of goggles; and/or other head-mountable support structure configurations.

In embodiments of the invention, the control circuitry 202 can include storage and processing circuitry for controlling the operation of the HMD 150A. The control circuitry 202 can include storage such as hard disk drive storage, non-volatile memory (e.g., electrically-programmable-read-only memory configured to form a solid state drive), volatile memory (e.g., static or dynamic random-access-memory), etc. Processing circuitry in the control circuitry 202 can be based on one or more microprocessors, microcontrollers, digital signal processors, baseband processors, power management units, audio chips, graphic processing units, application specific integrated circuits, and other integrated circuits. Computer program instructions can be stored on storage in the control circuitry 202 and run on processing circuitry in the control circuitry 202 to implement operations for HMD 150A (e.g., data gathering operations, operations involving the adjustment of components using control signals, image rendering operations to produce image content to be displayed for a user, etc.).

The input-output circuitry 204 can be used to allow the HMD 150A to receive data from external equipment (e.g., the computing system 110 (shown in FIG. 1); the transducer system 112; a portable device such as a handheld device; a laptop computer; or other electrical equipment) and to allow the user 140 (shown in FIG. 1) to provide the HMD 150A with user input. The input-output circuitry 204 can also be used to gather information on the environment in which HMD 150A is operating. Output components in the input-output circuitry 204 can allow the HMD 150A to provide the user 140 with output and can be used to communicate with external electrical equipment.

Display(s) 206 of the input-output circuitry 204 can be used to display images (e.g., the 3D VR environment 120 (shown in FIG. 1)) to the user 140 (shown in FIG. 1) of the HMD 150A. The display(s) 206 can be configured to have pixel array(s) to generate images that are presented to the user 140 through an optical system. The optical system can, if desired, have a transparent portion through which the user 140 (viewer) can observe real-world objects while computer-generated content is overlaid on top of the real-world objects by producing computer-generated images (e.g., the 3D VR environment 120) on the display(s) 206. In embodiments of the invention, the display(s) 206 are immersive views of the 3D VR environment 120, wherein the display(s) 206 place tiny screens and lenses close to the user's eyes to simulate large screens that encompass most of the user's field of view. As the user 140 performs actions like walking, head rotating (i.e., changing the point of view), data describing behavior of the user 140 (shown in FIG. 1) is fed to the computing system 110 (shown in FIG. 1) from the HMD 150A and/or the manipulation devices 152 (shown in FIG. 1).

The optical components 208 can be used in forming the optical system that presents images to the user 140. The optical components 208 can include static components such as waveguides, static optical couplers, and fixed lenses. The optical components 208 can also include adjustable optical components such as an adjustable polarizer, tunable lenses (e.g., liquid crystal tunable lenses; tunable lenses based on electro-optic materials; tunable liquid lenses; microelectromechanical systems (MLMS) tunable lenses; or other tunable lenses), a dynamically adjustable coupler, and other optical devices formed from electro-optical materials (e.g., lithium niobate or other materials exhibiting the electro-optic effect). The optical components 208 can be used in receiving and modifying light (images) from the display 206 and in providing images (e.g., the 3D VR environment 120) to the user 140 for viewing. In some embodiments of the invention, one or more of the optical components 208 can be stacked so that light passes through multiple of the components 208 in series. In embodiments of the invention, the optical components 208 can be spread out laterally (e.g., multiple displays can be arranged on a waveguide or set of waveguides using a tiled set of laterally adjacent couplers). In some embodiments of the invention, both tiling and stacking configurations are present.

The input-output devices 210 of the input-output circuitry 204 are configured to gather data and user input and for supplying the user 140 (shown in FIG. 1) with output. The input-output devices 210 can include sensors 212, audio components 214, and other components for gathering input from the user 140 and/or or the environment surrounding the HMD 150A and for providing output to the user 140. The input-output devices 210 can, for example, include keyboards; buttons; joysticks; touch sensors for trackpads and other touch sensitive input devices; cameras; light-emitting diodes; and/or other input-output components. For example, cameras or other devices in the input-output circuitry 204 can face the eyes of the user 140 and track the gaze of the user 140. The sensors 212 can include position and motion sensors, which can include, for example, compasses; gyroscopes; accelerometers and/or other devices for monitoring the location, orientation, and movement of the HDM 150A; and satellite navigation system circuitry such as Global Positioning System (GPS) circuitry for monitoring location of the user 140. Using the sensors 212, for example, the control circuitry 202 can monitor the current direction in which a user's head is oriented relative to the surrounding environment. Movements of the user's head (e.g., motion to the left and/or right to track on-screen objects and/or to view additional real-world objects) can also be monitored using the sensors 212.

In some embodiments of the invention, the sensors 212 can include ambient light sensors that measure ambient light intensity and/or ambient light color; force sensors; temperature sensors; touch sensors; capacitive proximity sensors; light-based proximity sensors; other types of proximity sensors; strain gauges; gas sensors; pressure sensors; moisture sensors; magnetic sensors; and the like. The audio components 214 can include microphones for gathering voice commands and other audio input and speakers for providing audio output (e.g., ear buds, bone conduction speakers, or other speakers for providing sound to the left and right ears of a user). In some embodiments of the invention, the input-output devices 210 can include haptic output devices (e.g., vibrating components); light-emitting diodes and other light sources; and other output components. The input-output circuitry 204 can include wired and/or wireless communications circuitry 216 that allows the HMD 150A (e.g., using the control circuitry 202) to communicate with external equipment (e.g., remote controls, joysticks, input controllers, portable electronic devices, computers, displays, and the like) and that allows signals to be conveyed between components (circuitry) at different locations in the HMD 150A.

Figure 3A:
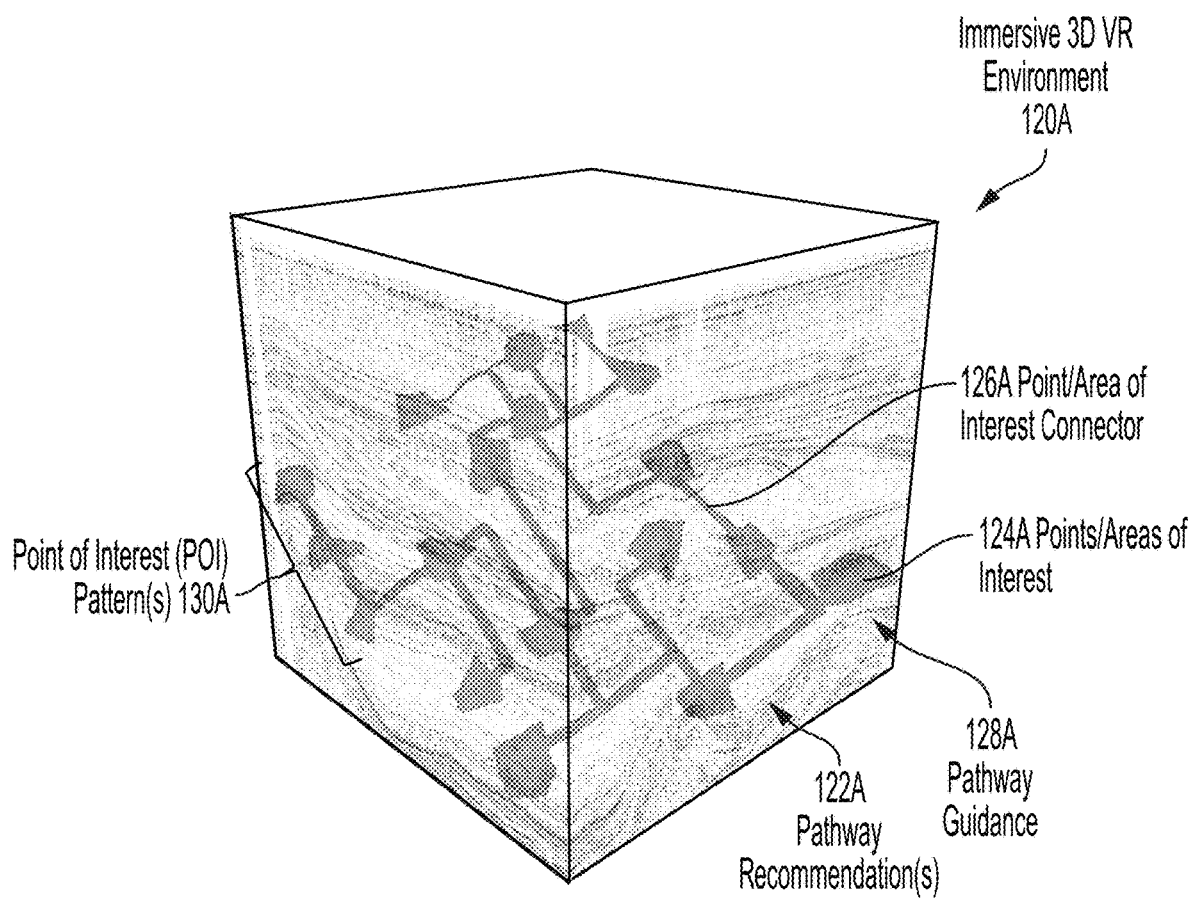
FIG. 3A depicts a block diagram illustrating an example of a three-dimensional (3D) virtual reality (VR) environment having one or more pathway recommendations according to embodiments of the invention.

FIG. 3A depicts an example of a novel immersive 3D VR environment 120A having pathway recommendations 122A in accordance with embodiments of the invention. The immersive 3D VR environment 120A is an example of how the 3D VR environment 120 (shown in FIG. 1) can be implemented, and the pathway recommendation(s) 120A are an example of how the pathway recommendation(s) 120

(shown in FIG. 1) can be implemented. In accordance with embodiments of the invention, the immersive 3D VR environment 120A is a virtual reality representation of the target environment 130 where the target environment 130 is a subterranean region, and where the task being performed by the user 140 is any one of a variety of different analyses and sub-analyses of the 3D VR environment 120A as a proxy for the target environment 130. The different analyses and sub-analyses of the 3D VR environment 120A relate to finding underground reservoirs of oil or natural gas in the target environment 130, and/or relate to supporting already-discovered underground reservoirs of oil or natural gas in the target environment 130.

The reflected acoustic signals 114 (shown in FIG. 1) used by the computing system 110 (shown in FIG. 1) to generate the immersive 3D VR environment 120A can be seismic waves, which are the same type of waves used to study earthquakes. In general, seismic waves of energy move through the earth just as sound waves move through the air. In oil and gas exploration, the transmission elements of multiple instances of the transducer systems 112 are spaced apart and configured to send seismic waves deep into the earth (i.e., the target environment 130). The seismic waves that bounce back (i.e., the reflected acoustic signals 114) are recorded by receiver elements of the transducer systems 112. This reflection process is known generally as reflection seismology. The reflected seismic waves are used by the computing system 110 to image a selected region (e.g., a 100 kilometer by 100 kilometer square) of the interior of the earth to generate the 3D VR environment 120A, which can be analyzed by the user 140. In the embodiments of the invention depicted in FIG. 3A, the user 140 is an expert interpreter trained to perform one or more types of analysis and interpretation tasks. For example, the tasks performed by the user 140 can be any one of a variety of different analyses and sub-analyses of the 3D VR environment 120A that relate to finding underground reservoirs of oil or natural gas within the target environment 130 and/or supporting already-discovered underground reservoirs of oil or natural gas within the target environment 130.

In accordance with aspects of the invention, the pathway recommendation 122A includes points of interest 124A, point-of-interest (POI) connectors 126A, pathway guidance 128A, and POI patterns 130A, configured and arranged as shown. In embodiments of the invention, the POI patterns 130A can be identified to the user 140 through the pathway guidance 128A. In aspects of the invention, the points of interest 124A can be implemented as multiple so-called "slices" of the immersive 3D VR environment 120A. In aspects of the invention, each slice is controlled to present to the user 140 a particular view (e.g., zoom-level; scale/size; shape/contour; orientation with respect to the user 140; and the like) of a portion of the 3D VR environment 120A that the computing system 110 has determined is an area of interest 124A to the overall task being performed by the user 140. In some embodiments of the invention, the points of interest 124A are two-dimensional (2D) "sliced" views highlighted within a 3D immersive view of the immersive 3D VR environment 120A being shown to the user 140 through a display 206 of the HMD 150A. In accordance with aspects of the invention, the points of interest 124A can be generated by machine learning algorithms (e.g., machine learning algorithm 320 shown in FIG. 3C; and/or classifier 910 shown in FIG. 9) trained to perform a machine learning (ML) task 322 (shown in FIG. 3C) on an intermediate 3D VR environment 318 (shown in FIG. 3C). Details of how the computing system 110 can utilize machine learning algorithms 320 to generate the points of interest 124A are depicted in FIG. 3C and described in greater detail subsequently herein.

The POI connectors 126A are various pathway segments that will be virtually traversed by the user 140 when moving from one instance of the points of interest 124A to another instance of the points of interest 124A under guidance received from the pathway guidance 128A of the pathway recommendations 122A. In embodiments of the invention, the computing system 110 can be configured to conduct an "accelerated traverse" of the user 140 through the POI connectors 126A by, upon receiving an appropriate command from the user 140 (e.g., through the manipulation device(s) 152 shown in FIG. 1), automatically moving the user 140 from one instance of the points of interest 124A through the POI connectors 126A to another instance of the points of interest 124A without requiring actual movement by the user 140; by requiring only minimal movement by the user 140; and/or by skipping the POI connectors 126A altogether when moving the user 140 from one instance of the points of interest 124A to another instance of the points of interest 124A.

The pathway guidance 128A includes various forms of communication (natural language text; natural language audio; visual cues; zoom-level adjustments; scale adjustments; adjustments to the orientation of the point of interest 124A with respect to the user 140; and the like) generated by the computing system 110 and provided through the HMD 150, 150A to the user 140 to actively guide the user 140 through the POI connectors 126A and/or the points of interest 124A. In embodiments of the invention, the pathway recommendation 122A, and more specifically the pathway guidance 128A, functions as recommendations/steps that the user 140 can follow, including for example hints on how to conduct an "accelerated traverse" of the 3D VR environment 120A using the shortest path(s).

In embodiments of the invention, the various forms of communication (natural language text; natural language audio; visual cues; zoom-level adjustments; scale adjustments; adjustments to the orientation of the point of interest 124A with respect to the user 140; and the like) generated by the pathway guidance 128A can communicate with the user 140 in a way that provides context for each instance of the points of interest 124A. In general, an individual instance of the points of interest 124A (i.e., each individual "slice" of the 3D VR environment 120) conveys limited information. However, it is the points of interest 124A that precede and/or follow a given point of interest 124A that can convey information relevant to the user task. The POI pattern 130A is one example of a meaningful grouping of the points of interest 124A, where the meaningful grouping conveys information that can be relevant to the user task. In embodiments of the invention, the various forms of communication provided by the pathway guidance 128A highlights to the user 140 that the points of interest 124A in the POI pattern 130A are related, and further provides to the user 140 an explanation of why the points of interest 124A in the POI pattern 130A are related, as well as an explanation of how the points of interest 124A in the POI pattern 130A are relevant to the user task. In some embodiments of the invention, the points of interest 124A in the POI pattern 130A can be sequential, non-sequential, and/or combinations thereof. In embodiments of the invention, the pathway guidance 128A can be configured to encourage the user 140 to traverse a given POI pattern(s) 130A multiple times until the user 140 provides feedback to the computing system 110 confirming that the user 140 sees and understands the meaning that the pathway guidance 128A asserts is contained within the POI pattern(s) 130A. In embodiments of the invention, a given POI pattern 130A can have any number of points of interest 124A, and the pathway guidance 128A can identify meaning conveyed within one POI pattern 130A, as well as meaning conveyed by groupings of separate instances of the POI pattern 130A.

In embodiments of the invention, the user 140 can be an expert trained to analyze the target environment 130 for the purpose of performing a variety of user tasks. In some aspects of the invention, the computing system 110 can be configured to pull the personalized information of the user 140 from a stored profile of the user 140. The pathway recommendation(s) 122A generated by the computing system 110 can take into account personalized information of the user 140, which allows various aspect of the pathway recommendation(s) 122, 122A to be personalized for the particular user 140. For example, if the stored profile of the user 140 indicates that the user 140 is a novice at analyzing the target environment 130, the computing system 110 can be configured and arranged to generate a pathway recommendation 122A that recommend paths through the 3D VR environment 120A that are appropriate for a novice at analyzing the target environment 130. If the stored profile of the user 140 indicates that the user 140 is trained to focus on analyzing particular subset features of the target environment 130, the computing system 110 can be configured and arranged to generate a pathway recommendation 122A that recommends paths through the 3D VR environment 120A that is appropriate for analyzing the particular subset features of the target environment 130. If the stored profile of the user 140 indicates that the user 140 is trained to focus on analyzing broader and more holistic features of the target environment 130, the computing system 110 can be configured and arranged to generate pathway recommendation(s) 122A that recommend paths through the 3D VR environment 120A that are appropriate for analyzing broader and more holistic features of the target environment 130. In some embodiments of the invention, the stored personalized information of the user 140 can be entered into the computing system 110 by the user 140.

Figure 3B:
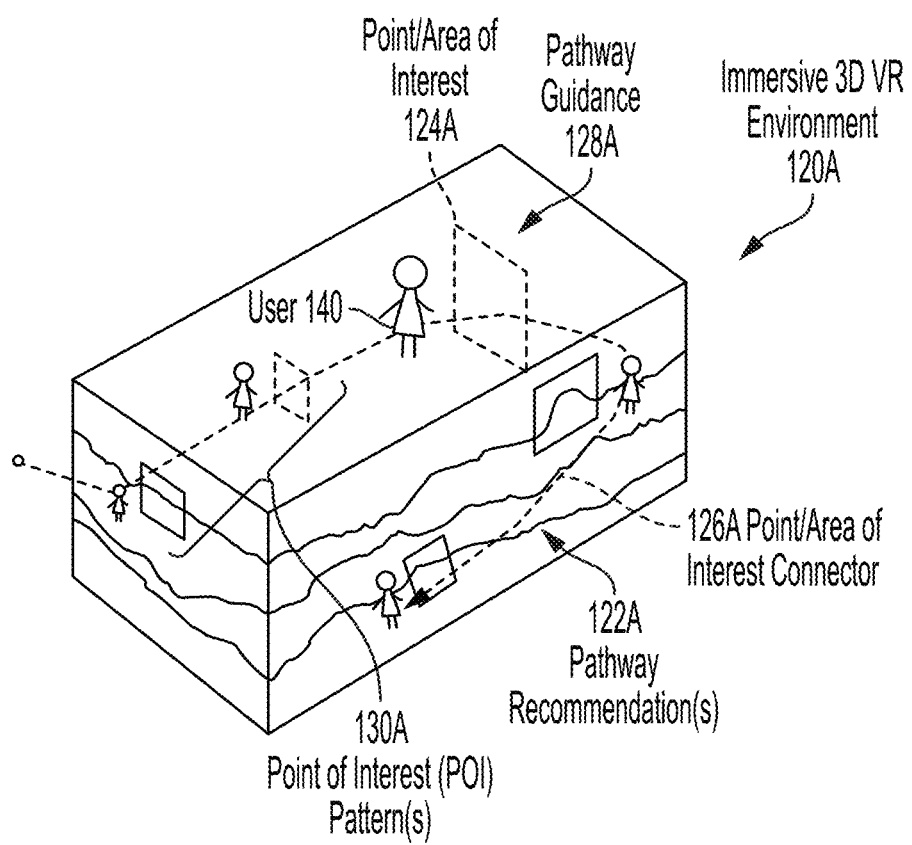
FIG. 3B depicts a block diagram illustrating an example of a 3D VR environment having a pathway recommendation according to embodiments of the invention.
Figure 3C:
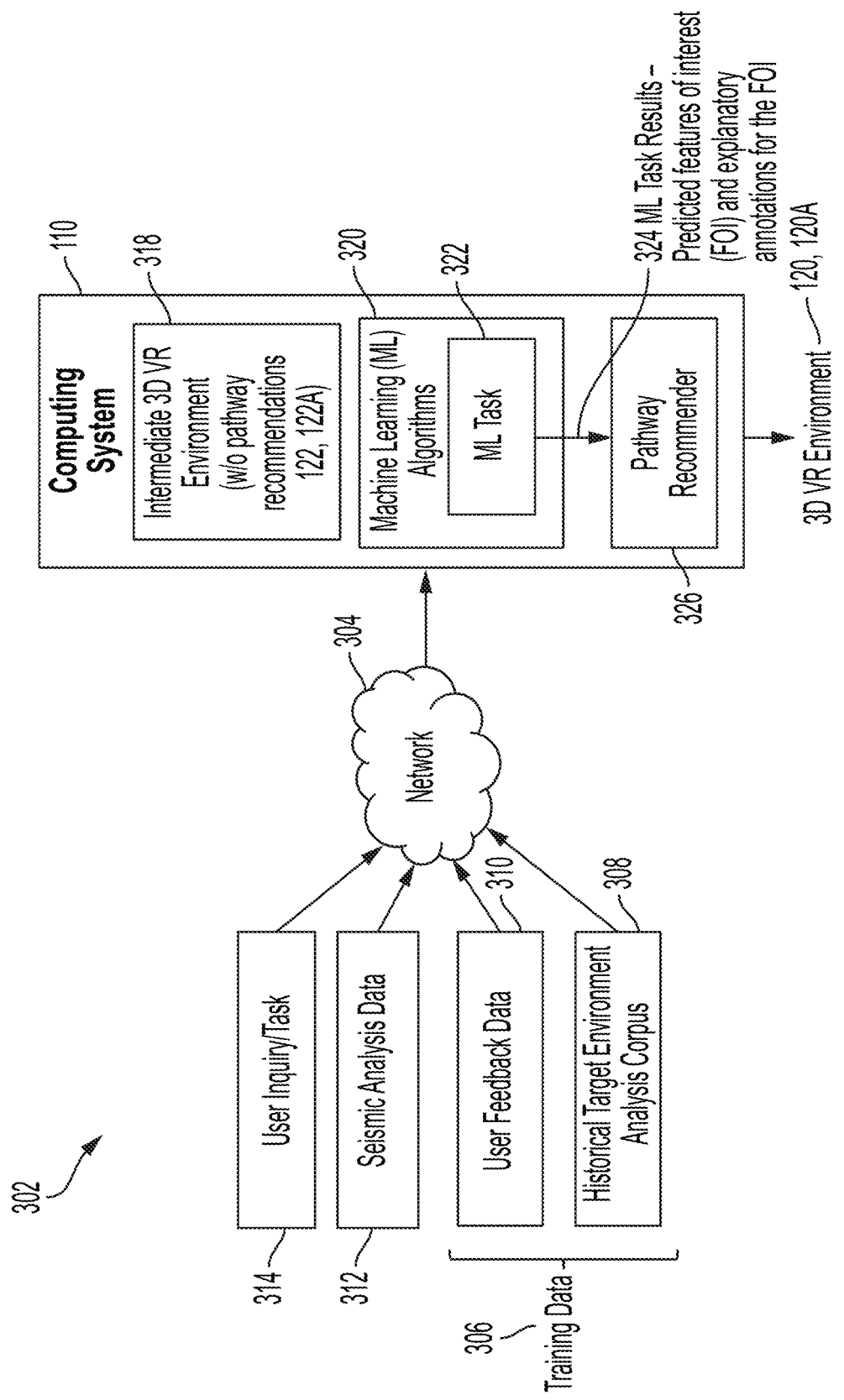
FIG. 3C depicts a block diagram illustrating a computing system having machine learning algorithms and pathway recommender modules according to embodiments of the invention.

FIG. 3B depicts another block diagram of the immersive 3D VR environment 120A having a pathway recommendation 122A formed from points of interest 124A, POI connectors 126A, pathway guidance 128A, and POI patterns 130A in accordance with embodiments of the invention. The immersive 3D VR environment 120A shown in FIG. 3B is substantially the same as the immersive 3D VR environment 120A shown in FIG. 3A except that in FIG. 3B multiple positions of the user 140 are shown, which depicts how the user 140 can be guided by the pathway guidance 128A to traverses the multiple connectors 126A and the multiple points of interest 124A of the pathway recommendation 122A. FIG. 3B better illustrates how each of the multiple instances of the points of interest 124A can be controlled, in accordance with aspects of the invention, to present to the user 140 a particular view (e.g., zoom-level; scale/size; shape/contour; orientation with respect to the user 140; and the like) that is selected by the computing system 110 to assist with the task being performed by the user 140. For example, the instances of the points of interest 124A shown in FIG. 3B have various sizes and various orientations with respect to the user 140. As previously noted herein, the tasks performed by the user 140 can be any one of a variety of different analyses and sub-analyses of the 3D VR environment 120A that relate to finding underground reservoirs of oil or natural gas within the target environment 130 and/or supporting already-discovered underground reservoirs of oil or natural gas within the target environment 130.

FIG. 3C depicts a block diagram illustrating a supporting system 302 that can be used to generate the 3D VR environment 120, 120A the pathway recommendation(s) 120, 122A in accordance with aspects of the invention. The system 302 includes the computing system 110 communicatively coupled to a network 304. The network 304 is configured to receive and couple to the computing system 110 various inputs including user inquiries (or tasks) 314, seismic analysis data 312, and training data 306. In embodiments of the invention, the seismic analysis data 312 includes any and all data that is required by the computing system 110 in order to generate the intermediate 3D VR environment 318, including but not limited to seismic data gathered by the transducer system 112 (shown in FIG. 1). The 3D VR environment 318 is intermediate in that the environment 318 does not yet include the pathway recommendations 122, 122A. The user inquiry/task 314 identifies details of a user task to be performed by the user 140. As previously noted herein, the tasks performed by the user 140 can be any one of a variety of different analyses that relate to finding underground reservoirs of oil or natural gas within the target environment 130, and/or supporting already-discovered underground reservoirs of oil or natural gas within the target environment 130. The user inquiry/task 314 can also include profile information of the user 140.

The computing system 110 includes machine learning algorithms 320 that have been trained to perform a machine learning (ML) task 322 on the intermediate 3D VR environment 318. In accordance with aspects of the invention, the ML task 322 generates ML task results 324 that include predicted features of interest (FOI) within the intermediate 3D VR environment 318, as well as predicted explanatory annotations of the predicted FOI. In accordance with aspects of the invention, the FOI are the features of the intermediate 3D VR environment 318 that are relevant to and/or support a successful completion of the user inquiry/task 314. In accordance with aspects of the invention, the explanatory annotations include but are not limited to explanations of why the predicted FOI of the intermediate 3D VR environment 318 are related to one another, as well as an explanation of how the predicted FOI of the intermediate 3D VR environment 318 are relevant to the user task. In accordance with aspects of the invention, the FOI, the explanatory annotations of the FOI, and other information (e.g., stored user profile information) are used by a pathway recommender module 326 of the computing system 110 to, in effect, solve an optimization problem that outputs the points of interest 124A, the pathway guidance 128A, and the POI pattern(s) 130A, all of which are used by the computing system 110 to generate the pathway recommendation 122, 122A; combine the pathway recommendation 122, 122A with the intermediate 3D VR environment 318; and output the 3D VR environment 120, 120A to the HMD 150, 150A. In embodiments of the invention, the pathway recommender module 326 is configured to include an optimization algorithm that executed iteratively by comparing various solutions until an optimum or a satisfactory solution is found.

In accordance with aspects of the invention, the machine learning algorithms 320 can be trained to perform the ML task 322 using the training data 306, which can include a historical target environment analysis corpus 308 and/or user feedback data 310. In aspects of the invention, the historical target environment analysis corpus 308 can include a wide variety of information from relevant prior analyses performed by trained interpreters (e.g., a geological scientist) on relevant prior target environments in order to complete one or more prior user tasks, including, for example, the task of finding underground reservoirs of oil or natural gas within the prior target environments and/or supporting already-discovered underground reservoirs of oil or natural gas within the prior target environments. For example, in some embodiments of the invention, the historical target environment analysis corpus 308 can include recorded data and analyses (seismic measurements; graphs; charts; written notes; written reports; descriptions of the supporting tools and techniques used in the prior analyses; explanations of successful analysis techniques; explanations of unsuccessful analysis techniques; explanations of geological patterns that contributed to successfully completing the task; explanations of geological patterns that did not contribute to successfully completing the task; and the like) generated by the trained interpreters (e.g., a geological scientist) who successfully completed the one or more prior user tasks. In some embodiments of the invention, the historical target environment analysis corpus 308 can include recorded data and analysis (seismic measurements; graphs; charts; written notes; written reports; descriptions of the supporting tools and techniques used in the prior analyses; explanations of successful analysis techniques; explanations of unsuccessful analysis techniques; explanations of geological patterns that did not contribute to successfully completing the task; and the like) generated by trained interpreters (e.g., a geological scientist) who did not successfully complete the one or more prior user tasks.

In embodiments of the invention, the user feedback data 310 is feedback the system 100 receives from the user 140 about the pathway recommendation(s) 122, 122A when the user 140 is being guided through the 3D VR environment 120, 120A by the pathway recommendation(s) 122, 122A. In accordance with aspects of the invention, the user feedback data 310 includes information that conveys how well a given pathway recommendation 122A is performing. For example, the user feedback data 310 can include the user's agreement and/or disagreement with some aspect of the pathway recommendation(s) 122, 122A, including but not limited to the pathway guidance 128A and/or the POI pattern(s) 130A. In some embodiments of the invention, the user feedback data 310 can include the user's observations (e.g., time spent on a POI, zooming in/out on POI) about the 3D VR environment 120, 122A that are not part of the pathway recommendation(s) 122, 122A but that the user 140 believes is or may be relevant to the user inquiry/task 314 based on the user's observations while traversing the 3D VR environment 120, 120A. The machine learning algorithms 320 can utilize the user feedback data 310 to assess the accuracy of the pathway recommendation 122A that is currently being provide to the user 140; further train the machine learning algorithms 320 and the ML task 322; and dynamically adjust any aspect of the pathway recommendation(s) 122, 122A.

Figure 8A:
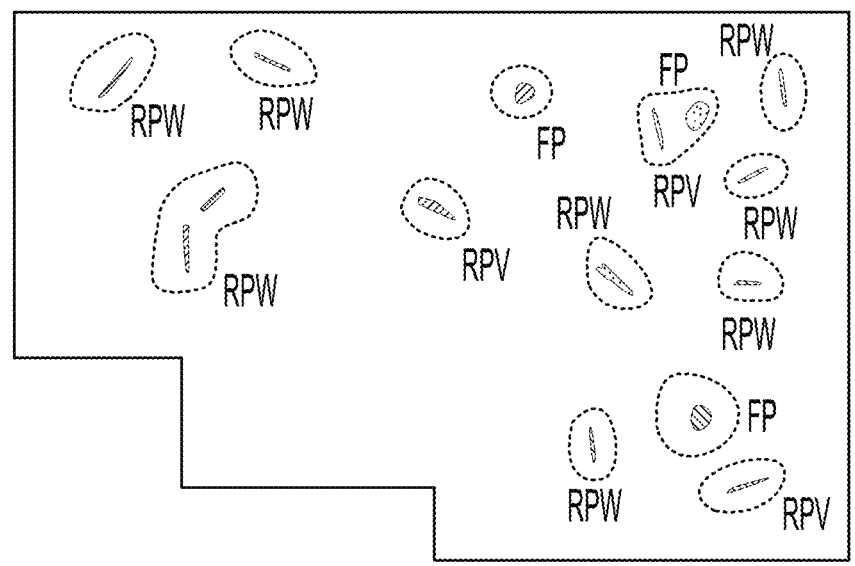
FIG. 8A depicts a block diagram illustrating results of operations performed by the methodology shown in FIG. 7.
Figure 8B:
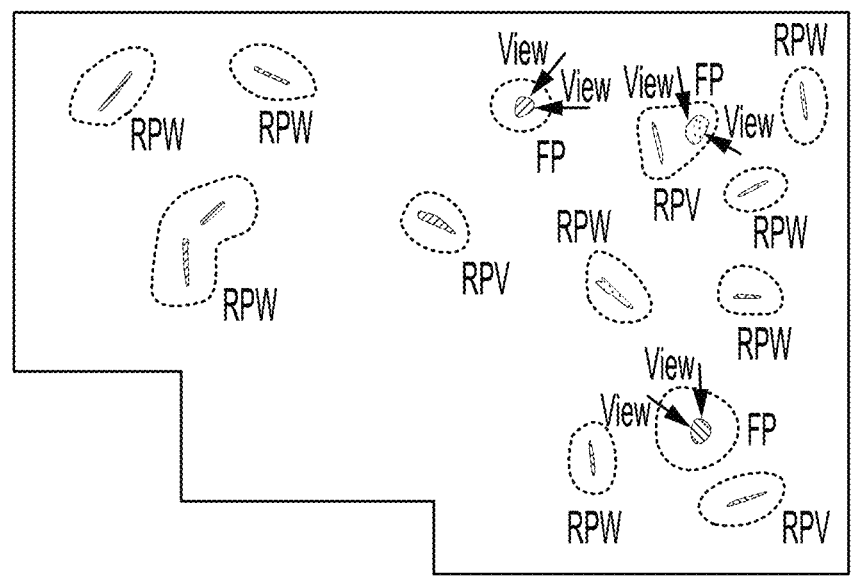
FIG. 8B depicts a block diagram illustrating results of operations performed by the methodology shown in FIG. 7.
Figure 8C:
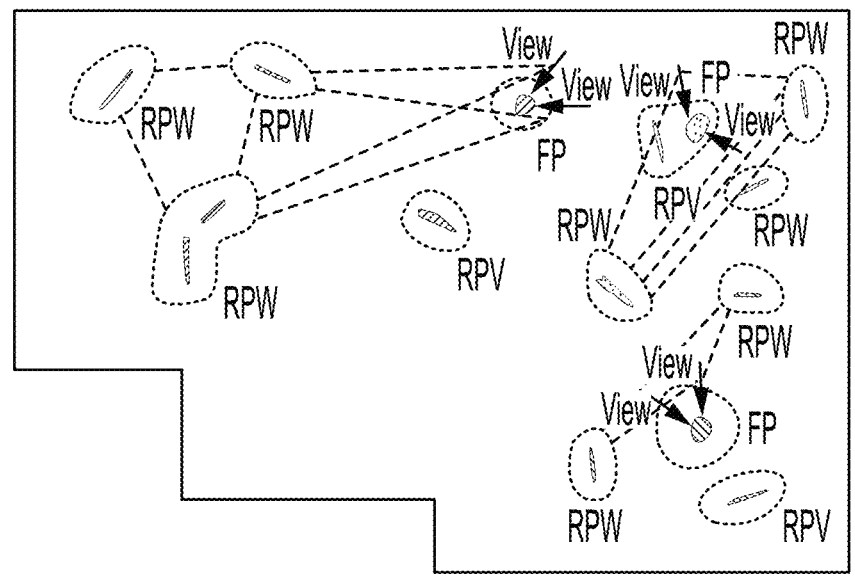
FIG. 8C depicts a block diagram illustrating results of operations performed by the methodology shown in FIG. 7.
Figure 8D:
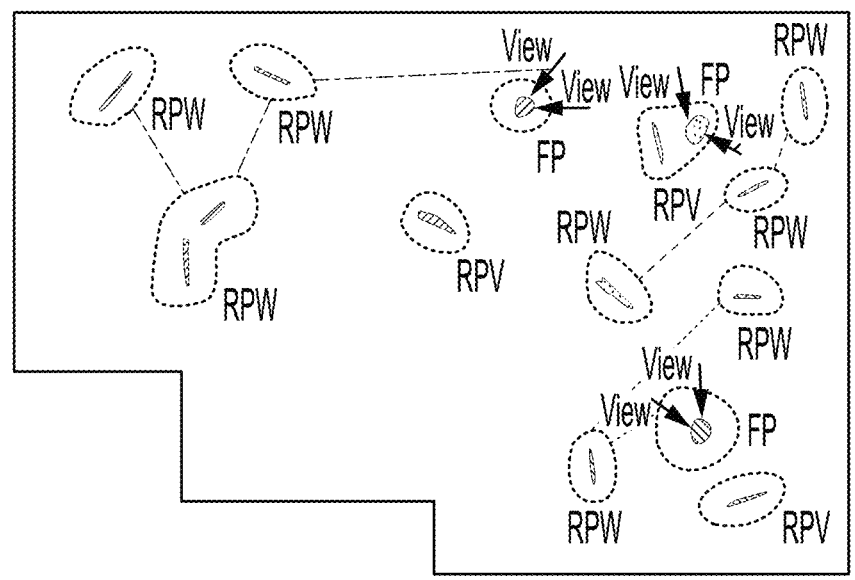
FIG. 8D depicts a block diagram illustrating results of operations performed by the methodology shown in FIG. 7.
Figure 8E:
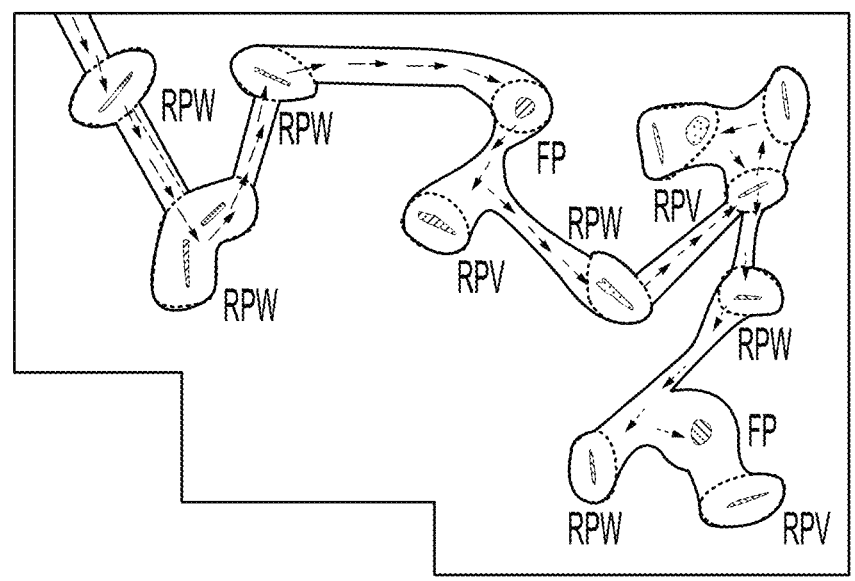
FIG. 8E depicts a block diagram illustrating results of operations performed by the methodology shown in FIG. 7.
Figure 9:
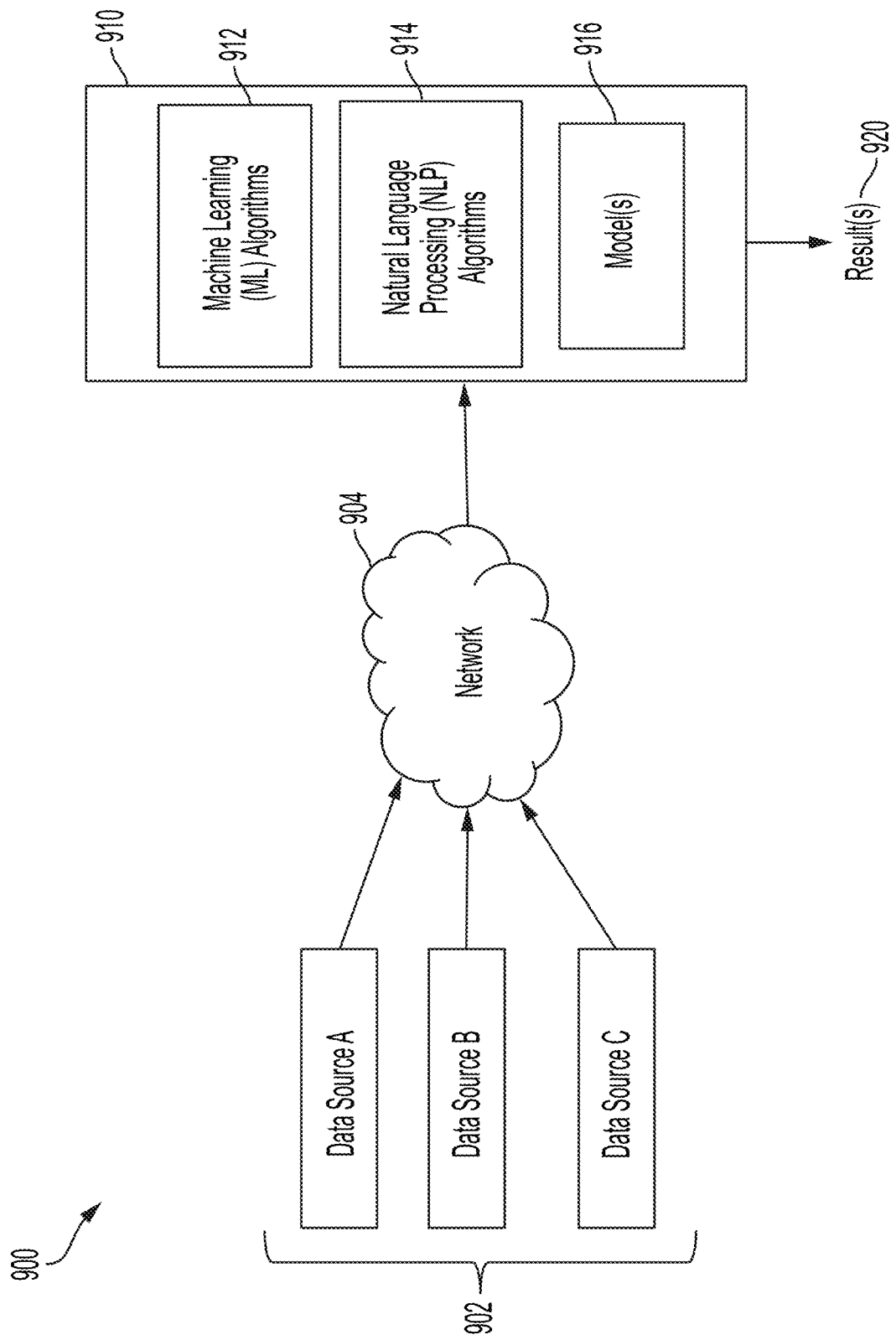
FIG. 9 depicts a machine learning system that can be utilized to implement aspects of the invention.

In aspects of the invention, the system 302 can be configured and arranged to have the features and functionality of the machine learning or classifier system 900 depicted in FIG. 9. Additional details of how the system 302 can be utilized to perform the ML task 322 are depicted in FIGS. 6-8E and described in greater detail subsequently herein. Additional details of how the computing system 110 uses the ML results 324 to form the points of interest 124A, the POI connectors 126A, the pathway guidance 128A, and the POI guidance 130A of the pathway recommendation 122, 122A are depicted in FIGS. 6-8E and described in greater detail subsequently herein.

Figure 4:
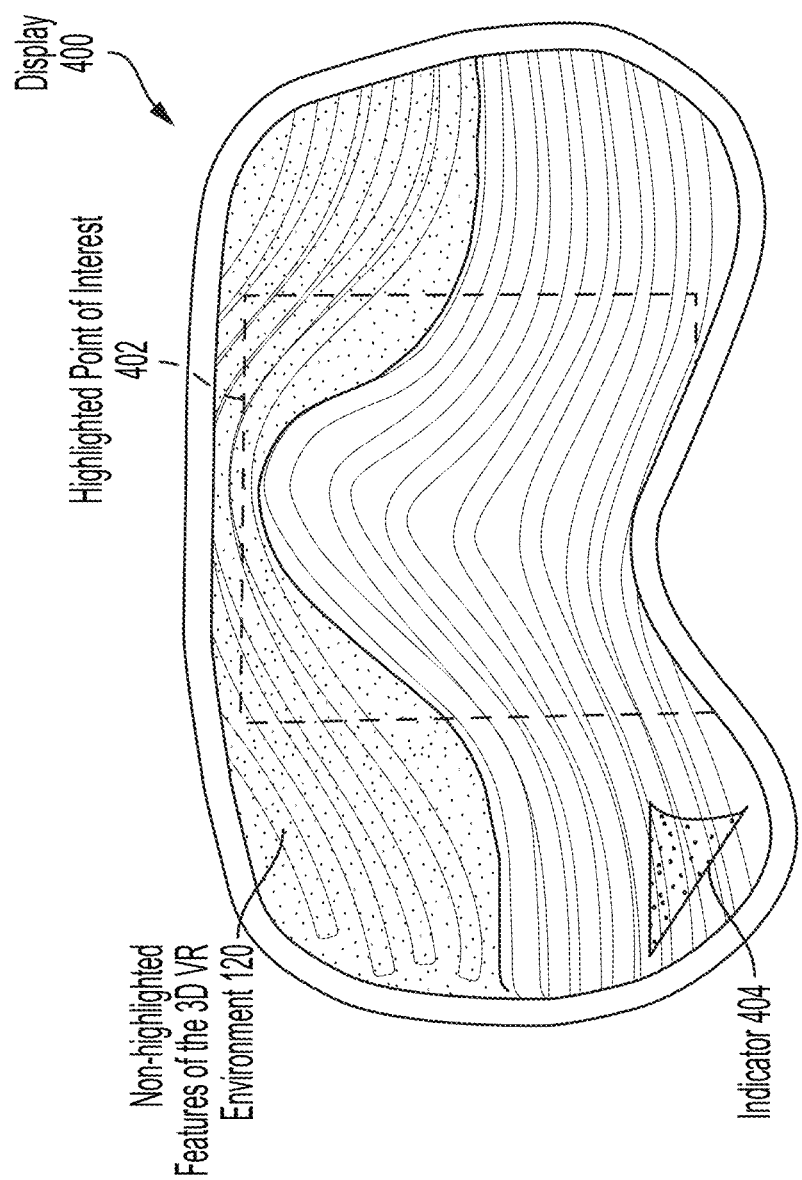
FIG. 4 depicts a block diagram illustrating a display of a head-mounted device (HDM) according to embodiments of the invention.

FIG. 4 depicts a display 400, which is an example of how the display 206 of the HMD 150A can be implemented in accordance with aspects of the invention. The display 400 is configured to provide visual sensory feedback configured and arranged to convey the 3D VR environment 120, 120A to the user 140 in accordance with embodiments of the invention. As shown, the display 400 can be segmented into various regions including a highlighted point of interest 402 (which corresponds to one of the multiple instances of the points of interest 124A (shown in FIGS. 3A and 3B)); a visualization of the non-highlighted seismic data in the 3D VR environment 120, 120A; and an indicator 404 (e.g., an arrow) that guides the user 140 along the pathway recommendation 120, 122A to the next instance of the highlighted point of interest 402 (which corresponds to one of the multiple instances of the points of interest 124A (shown in FIGS. 3A and 3B)). In some embodiments of the invention, the pathway recommendation(s) 122, 122A are personalized for the particular user 140 and the particular user task (e.g., the user inquiry/task 314) being performed by the user 140. In embodiments of the invention, the pathway recommendation(s) 122, 122A further include selection of the appropriate scale and orientation of each highlighted point of interest 402 that is appropriate for the user 140 and the task.

In embodiments of the invention, the display 400 of the HMD 150, 150A is configured and arranged to track and store what the user 140 views while navigating the pathway recommendations 122, 122A through the 3D VR environment 120, 120A, thereby providing a provenance of data (e.g., the user feedback data 310) that can be used by the computing system 110 to dynamically provide give new insights and annotations (e.g., the pathway guidance 128A) for the user 140, and to improve training of the ML task 322. In embodiments of the invention, the provenance of data tracked by the display 400 documents the inputs, entities, systems, and processes that influence the data of what the user 140 views, which in effect provides a historical record of the data of what the user 140 views and its origins. In some embodiments of the invention, the provenance of data tracked by the display 400 includes a pathway delta, which is a difference, if any, between the pathway recommendation(s) 122, 122A presented to the user 140 and the actual pathway the user 140 traverses in moving through the 3D VR environment 120, 120A. In embodiments of the invention, the pathway delta can also be used by the computing system 110 to dynamically provide give new insights and annotations (e.g., the pathway guidance 128A) for the user 140, and to improve training of the ML task 322.

Figure 5:
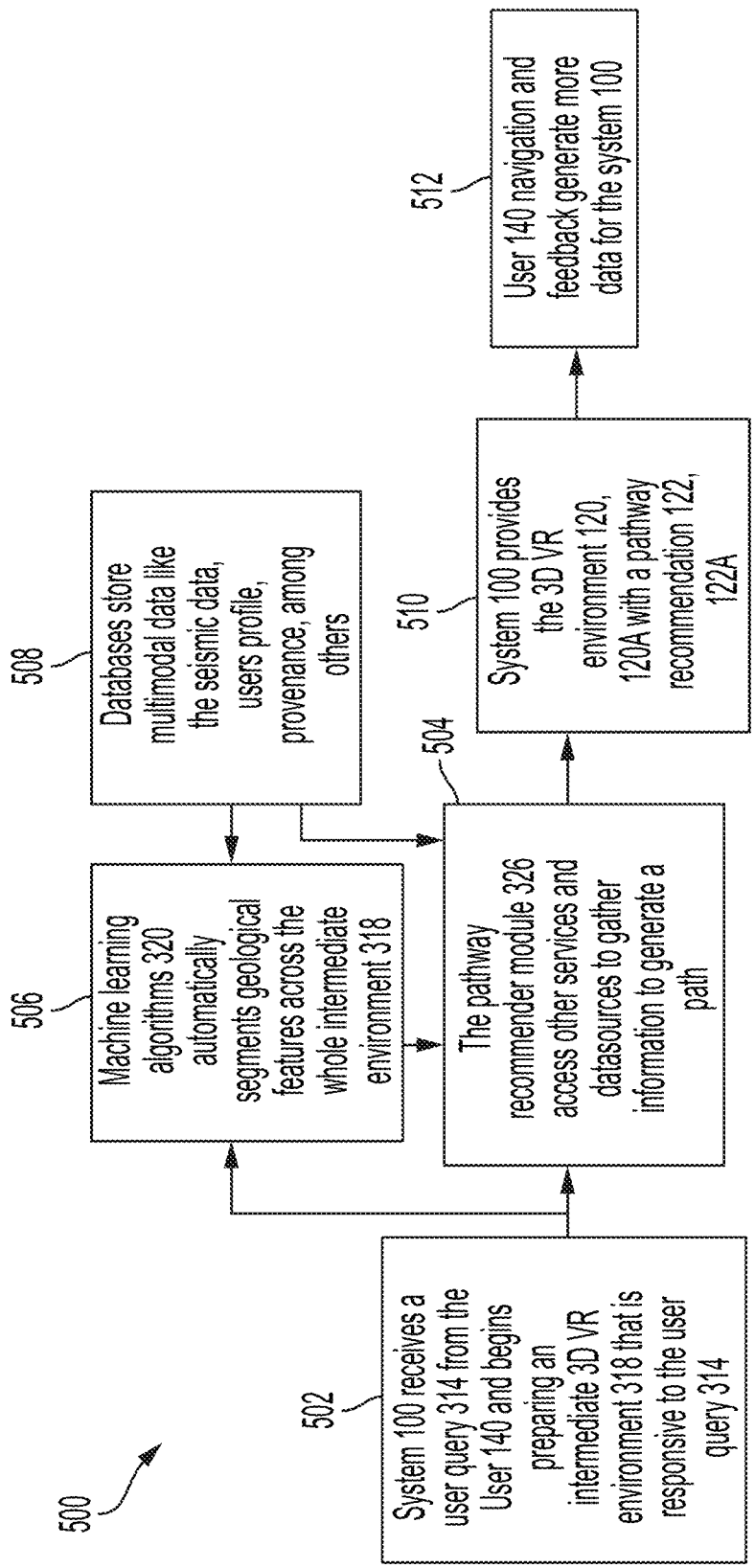
FIG. 5 depicts a flow diagram illustrating a computer-implemented methodology according to embodiments of the invention.

FIG. 5 depicts a computer-implemented methodology 500 in accordance with aspects of the invention. The methodology 500 can be implemented by the system 100 to generate the 3D VR environment 120, 120A having pathway recommendations 122, 122A in accordance with embodiments of the invention. The methodology 500 begins at block 502 where the system 100 receives the user query 314 from the user 140, along with seismic data 312 (e.g., from the transducer system 112) and begins preparing the intermediate 3D VR environment 318 that is responsive to the user query 314 but that does not include the pathway recommendations 122, 122A. Block 502 passes the intermediate 3D VR environment 318 to block 504 and block 506. In block 506, the machine learning algorithms 320 have been trained to perform the ML task 322 using training data 306 (e.g., user feedback data 310 and/or historical target environment analysis corpus 308) retrieved from databases at block 508. As previously described herein, the ML task 322 generates ML task results 324 that include predicted FOI within the intermediate 3D VR environment 318, as well as predicted explanatory annotations of the predicted FOI. In accordance with aspects of the invention, the FOI are the features of the intermediate 3D VR environment 318 that are relevant to and/or support a successful completion of the user inquiry/task 314.

In accordance with aspects of the invention, at block 504 the pathway recommender module 326 receives the intermediate 3D VR environment 318 from block 502; receives the ML task results 324 from block 506; receives various multi-model data (e.g., user profile data) from the databases at block 508; and uses the outputs from blocks 502, 506, 508 to generate the 3D VR environment 120, 120A having the pathway recommendation 122, 122A. More specifically, at block 504 the pathway recommender module 326 uses the FOI (part of the ML task results 324), the explanatory annotations of the FOI (part of the ML task results 324), and other information (e.g., stored user profile information) to generate the points of interest 124A, the pathway guidance 128A, and the POI patterns 130A, all of which are used by the pathway recommender 326 to generate the pathway recommendation 122, 122A; combine the pathway recommendation 122, 122A with the intermediate 3D VR environment 318; and output the 3D VR environment 120, 120A.

At block 510, the HMD 150, 150A receives the 3D VR environment 120, 120A and uses the 3D VR environment 120, 120A to generate and present the display 400 to the user 140. At block 512, the user 140 uses the pathway recommendations 122, 122A as a guide to navigating the 3D VR environment 120, 122A. As previously noted herein, in embodiments of the invention, the display 400 of the HMD 150, 150A is configured and arranged to track and record what the user 140 views while navigating the pathway recommendations 122 through the 3D VR environment 120, 120A, thereby providing a provenance of data (e.g., the user feedback data 310) that can be used by the computing system 110 to dynamically provide give new insights and annotations (e.g., the pathway guidance 128A) for the user 140, and to improve training of the ML task 322. In embodiments of the invention, the provenance of data tracked by the display 400 documents the inputs, entities, systems, and processes that influence the data of what the user 140 views, which in effect provides a historical record of the data of what the user 140 views and its origins. In some embodiments of the invention, the provenance of data tracked by the display 400 includes a pathway delta, which is a difference, if any, between the pathway recommendation(s) 122, 122A presented to the user 140 and the actual pathway the user 140 traverses in moving through the 3D VR environment 120, 120A. In embodiments of the invention, the pathway delta can also be used by the computing system 110 to dynamically provide give new insights and annotations (e.g., the pathway guidance 128A) for the user 140, and to improve training of the ML algorithms 320 to perform the ML task 322.

Figure 6:
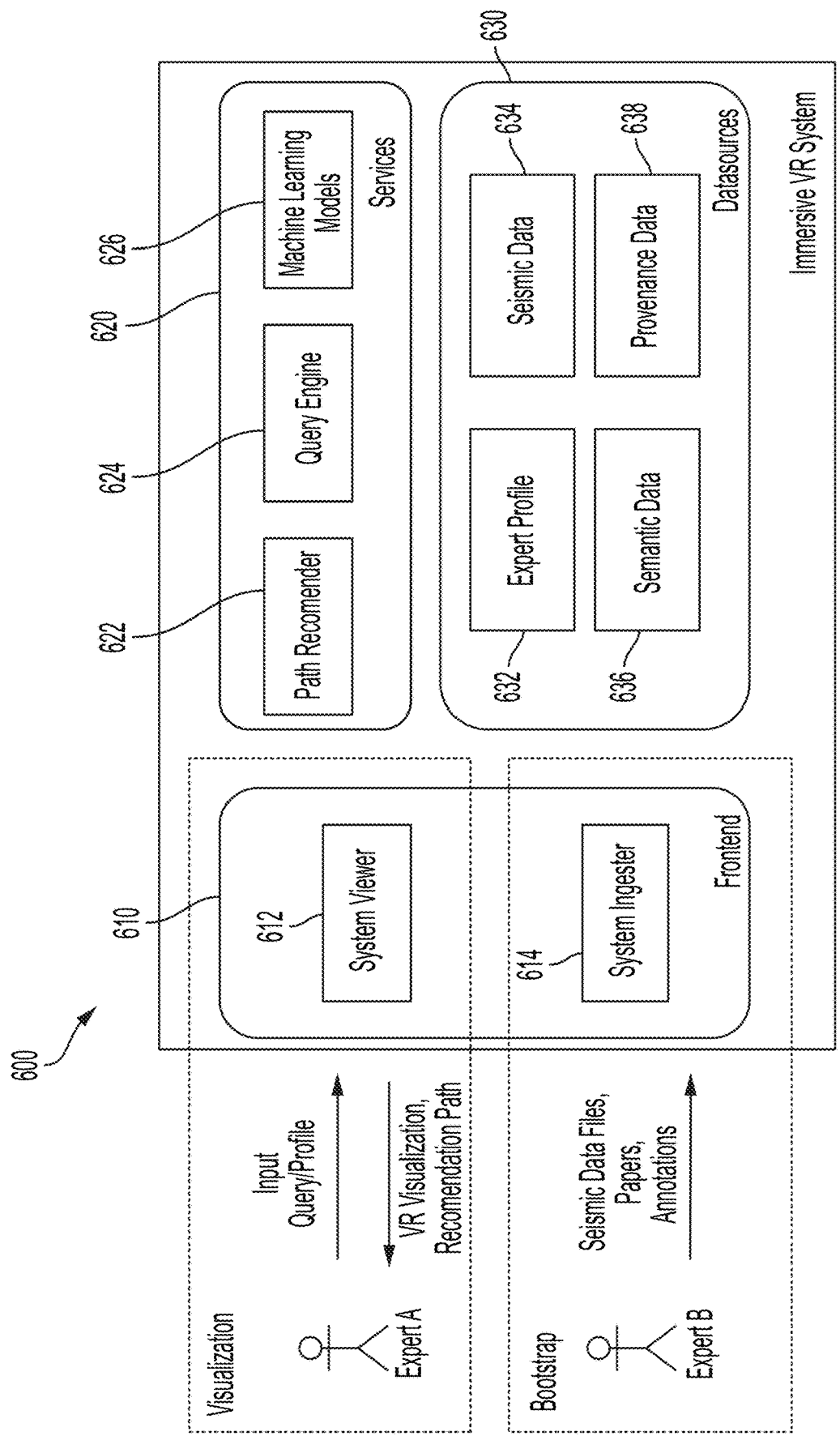
FIG. 6 depicts a block diagram illustrating a system according to embodiments of the invention.

FIG. 6 depicts a block diagram illustrating an immersive VR system 600 according to embodiments of the invention. In accordance with aspects of the invention, the immersive VR system 600 is a more detailed example of how portions of the immersive VR system 100 (shown in FIG. 1) can be implemented. As shown in FIG. 6, the system 600 includes a frontend module 610, a service module 620, and a datasources module 630. The frontend module 610 includes a system viewer module 612 and a system ingester module 614. The service module 620 includes a path recommender module 622, a query engine 624, and a ML models module 626. The data sources module 630 includes an expert profile module 632, a seismic data module 634, a semantic data module 636, and a provenance data module 638.

Expert A interfaces with the frontend module 610, which includes the system ingester module 614 and the system viewer module 612, configured to perform visualization operations and bootstrap operations. Visualization operations include the core functionality of the system 600, including displaying the 3D VR environment(s) 120, 120A to Expert A. Bootstrap operations include the loading and ingestion of various types of data used by the system 600 from various sources. The frontend module 610 also receives and loads base input data (e.g., seismic data files, papers, annotations, and the like) from multiple sources. The base input data includes data that will be used by the system 600 to generate the 3D VR environment(s) 120, 120A with pathway recommendation(s) 122, 122A. The system ingester module 614 of the frontend module 610 is an administrative system configured and arranged to input and manage data inputs for the entire system 600. Expert A interfaces with the frontend module 610 to input to the system viewer module 612 a variety of user inputs, including user queries and/or user profile information. Expert A also interfaces with the viewer system module 612 to receive from the system viewer module 612 the 3D VR environments 120, 120A having the pathway recommendations 122, 122A. In accordance with aspects of the invention, Expert A corresponds to user 140; the user queries and the user profile information correspond to the user inquiry/task 314; and the system view module 612 corresponds to the HMD 150, 150A and the manipulation device(s) 152.

The services module 620 includes various services or functionality that process and generate the pathway recommendations 122, 122A that will be displayed by the system viewer module 612. The machine learning model module 626 can be used to identify or predict fields of interest (FOI) in the intermediate 3D VR environment 318. The query engine module 624 executes queries against data in the datasources module 630 to provide responses/answers that will be used by the machine learning model modules 626 and the path recommender module 622. The path recommender module 622 joins data from multiple sources and solves an optimization problem to generate the pathway recommendation(s) 122, 122A. Services module 620 corresponds to the functionality of the computing system 110 depicted in FIG. 3C; the machine learning model modules 626 corresponds to the ML algorithms 320 shown in FIG. 3C; and the pathway recommender module 622 corresponds to the pathway recommender module 326 shown in FIG. 3C.

The datasources module 630 can be implemented as a multimodal database designed to support multiple data models against a single, integrated backend. Document, graph, relational, and key-value models are examples of data models that can be supported by the multimodal database implementation of the datasources module 630. In accordance with aspects of the invention, the various modules that make up the datasources module 630 include data/information gathered in real time for implementation of a specific user inquiry/task 314 (e.g., user inquiry/task 314, seismic analysis data 312, and user feedback data 310), along with historical data (e.g., historical target environment analysis corpus 308) that has been gathered from a variety of sources and stored for a variety of uses, including but not limited to training the machine learning model modules 626. The expert profile data module 632 corresponds to the previously-described stored profile data of the user 140; the seismic data module 634 corresponds to the seismic analysis data 312 and/or the historical target environment analysis corpus 308; the semantic data module 636 corresponds to any and all natural language data utilized by the system 600, including but not limited to information provided in the pathway guidance 128A; and the provenance data module 638 corresponds to user feedback data 310 shown in FIG. 3C.

In embodiments of the invention, Expert B represents and corresponds to the users from which the historical portions of the datasources module 630 are derived. In embodiments of the invention, the historical portions of the datasources module 630 represents and corresponds to the historical target environment analysis corpus 308 shown in FIG. 3C. In embodiments of the invention, the machine learning model module 626 can be trained in substantially the same manner as the ML algorithms 320 shown in FIG. 3C and the ML classifier system 900 shown in FIG. 9.

Figure 7:
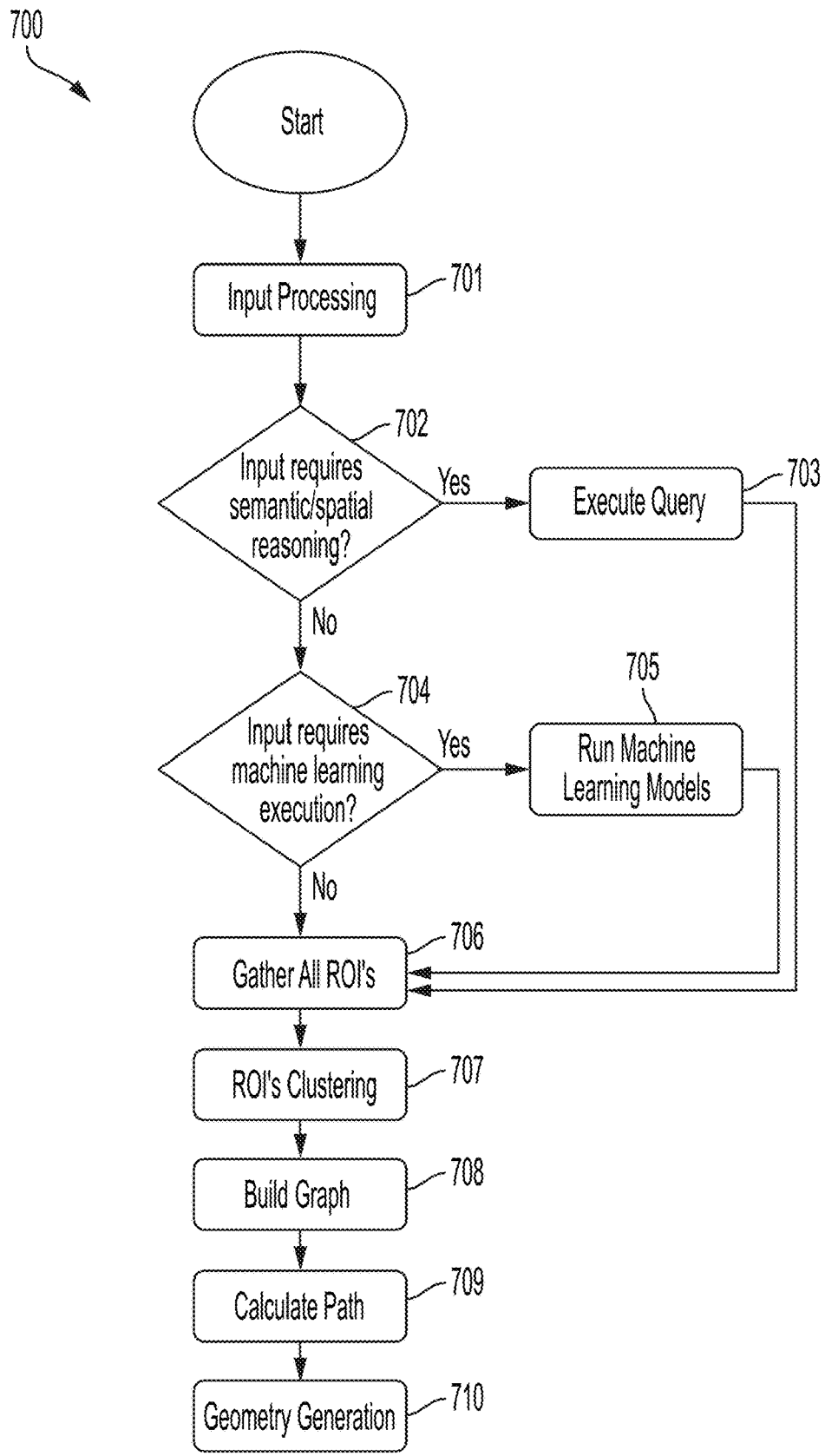
FIG. 7 depicts a flow diagram illustrating a computer-implemented methodology according to embodiments of the invention.

FIG. 7 depicts a flow diagram illustrating a computer-implemented methodology 700 according to embodiments of the invention. The methodology 700 can be performed by the system 600. FIGS. 8A-8E depict block diagrams illustrating results of a path recommender algorithm represented by operations performed at blocks 707, 708 709 of the computer-implemented methodology 700. FIGS. 8A-8E depict a personalized pathway recommendation 122B at various stages at it is being constructed by the operations performed at block 707, 708, 709 of the computer-implemented methodology 700. The following description of the methodology 700 will make reference to the flow diagram depicted in FIG. 7, along with the block diagrams depicted in FIGS. 8A-8E where appropriate.

At block 701, the system 600 receives the input which could be a task that is defined as a query or a structured profile of Expert A. At decision block 702, if the input requires semantic/spatial reasoning, the pathway recommender module 622 prepare a query to submit to query engine module 624. At block 703, the query engine module 624 fetches data from multiple sources in the datasources module 630, including for example semantic data from the semantic data module 632 that can be used to execute reasoning over labeled data along the profile preferences to filter relevant results; and/or calculate spatial operations to find interesting setup of structure with important spatial relationships. At decision block 702, if the input does not require semantic/spatial reasoning, the method moves to decision block 704. At block 704, if the input requires machine learning models and those are available to the system 600, block 704 will submit the input to the machine learning model module 626 for processing. At block 705, the machine learning model module 626 receives the parameters and seismic data to segment features of interest (FOI) in batches and output the FOI back to the path recommender module 622. At block 706, the path recommender module 622 gathers all ROI's from the block 705 to prepare them to be incorporated into the path generation operations to be performed by the pathway recommender module 622.

Blocks 707-709 represent operations performed by a pathway recommender algorithm of the pathway recommender module 622. At block 707, and as depicted in FIGS. 8A-8C, the pathway recommender module 626 clusters ROIs that are near or have spatial dependency that makes it appropriate for them to be inspected in the same view, which in turn will be in the same room. The pathway recommender module 622 splits ROI's into two types, the reference points (RP) and the focus points (FP), which are the points to be studied, and the points that Expert A will face. The RPs are objects that Expert A must gain a spatial relationships of in order to understand a specific FP better. The pathway recommender module 622 classifies the RP into two groups, the ones that should always be visible (RPV) from the FP and the ones that Expert A should view during the walk (RPW). The pathway recommender module 622 clusters the RP of each FP by distance, i.e., RPs that are closer than a threshold and are related for the same FP, are considered one. Then the pathway recommender module 622 creates a cave room for each cluster.

At block 708, and as depicted in FIG. 8D, the pathway recommender module 622 creates a graph in which each cluster is a node, and the edges have distance and/or the relevance among the nodes based on weights applied to the edges. The rooms are generated for the geological features by calculating the bound volumes of them. The rooms are connected by creating a tunnel or corridor shape geometry by interpolating the boundaries of the room.

At block 709, and as depicted in FIG. 8E, the pathway recommender module 622 generates a recommended pathway by traversing the graph following shortest path criteria or relevance between clusters. At block 710, the pathway recommender module 622 synthesizes the geometry of the recommended pathway.

Aspects of the invention can be applied to a variety of types of target environment 130. For example, embodiments of the invention can be used to perform fluid analysis and characterization tasks where the target environment 130 is a reservoir, and the 3D VR environment 120, 122A is a simulation of the reservoir. In the 3D VR environment 120, reservoir data are represented by 3D cells forming volumetric data and 4D data as well, wherein the value of each cell can change over time. Expert A can be a reservoir engineers interested in visualizing estimated physical properties generated by simulations in a reservoir. For example, engineers may simulation the arrangement for wells and estimate the most efficient setup for oil or gas exploration. The pathway recommender module 622 can analyze the results of a simulation and suggest a path with point of view highlighting changes on key regions and wells locations. For four-dimensional (4D) simulations, it can be more difficult to follow the changes, and embodiments of the invention can contribute to improving Expert A's comprehension of such cases.

As another example, embodiments of the invention can be used to perform immersive analysis over a computerized tomography (CT) scan. A CT scan combines a series of X-ray images taken from different angles around the body and uses computer processing to create cross-sectional images (slices) of the bones, blood vessels and soft tissues inside your body. CT scan images provide more-detailed information than plain X-rays do. The several slices of a CT scan can be combined to generate a 3D volume analogous to the 3D VR environment 120A generated for seismic data. Using visualization techniques, the CT scan 3D volume can be visualized using transfer functions that set opacity of voxels and allows users to visualize internal structures of the data. Embodiments of the invention can generate the pathway recommendation 122 for the CT scan 3D volume that allow the user 140 to virtually navigate the human body to assist with image diagnostic operations or with review and development of a surgery plan.

Additional details of machine learning techniques that can be used to aspects of the invention disclosed herein will now be provided. The various types of computer control functionality of the processors described herein can be implemented using machine learning and/or natural language processing techniques. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, transcribing speech into text, and the like. Clustering tasks identify similarities between objects, which it groups according to those characteristics in common and which differentiate them from other groups of objects. These groups are known as "clusters."

An example of machine learning techniques that can be used to implement aspects of the invention will be described with reference to FIGS. 9 and 10. Machine learning models configured and arranged according to embodiments of the invention will be described with reference to FIG. 9. Detailed descriptions of an example computing system and network architecture capable of implementing one or more of the embodiments of the invention described herein will be provided with reference to FIG. 11.

FIG. 9 depicts a block diagram showing a machine learning or classifier system 900 capable of implementing various aspects of the invention described herein. More specifically, the functionality of the system 900 is used in embodiments of the invention to generate various models and sub-models that can be used to implement computer functionality in embodiments of the invention. The system 900 includes multiple data sources 902 in communication through a network 904 with a classifier 910. In some aspects of the invention, the data sources 902 can bypass the network 904 and feed directly into the classifier 910. The data sources 902 provide data/information inputs that will be evaluated by the classifier 910 in accordance with embodiments of the invention. The data sources 902 also provide data/information inputs that can be used by the classifier 910 to train and/or update model(s) 916 created by the classifier 910. The data sources 902 can be implemented as a wide variety of data sources, including but not limited to, sensors configured to gather real time data, data repositories (including training data repositories), and outputs from other classifiers. The network 904 can be any type of communications network, including but not limited to local networks, wide area networks, private networks, the Internet, and the like.

Figure 11:
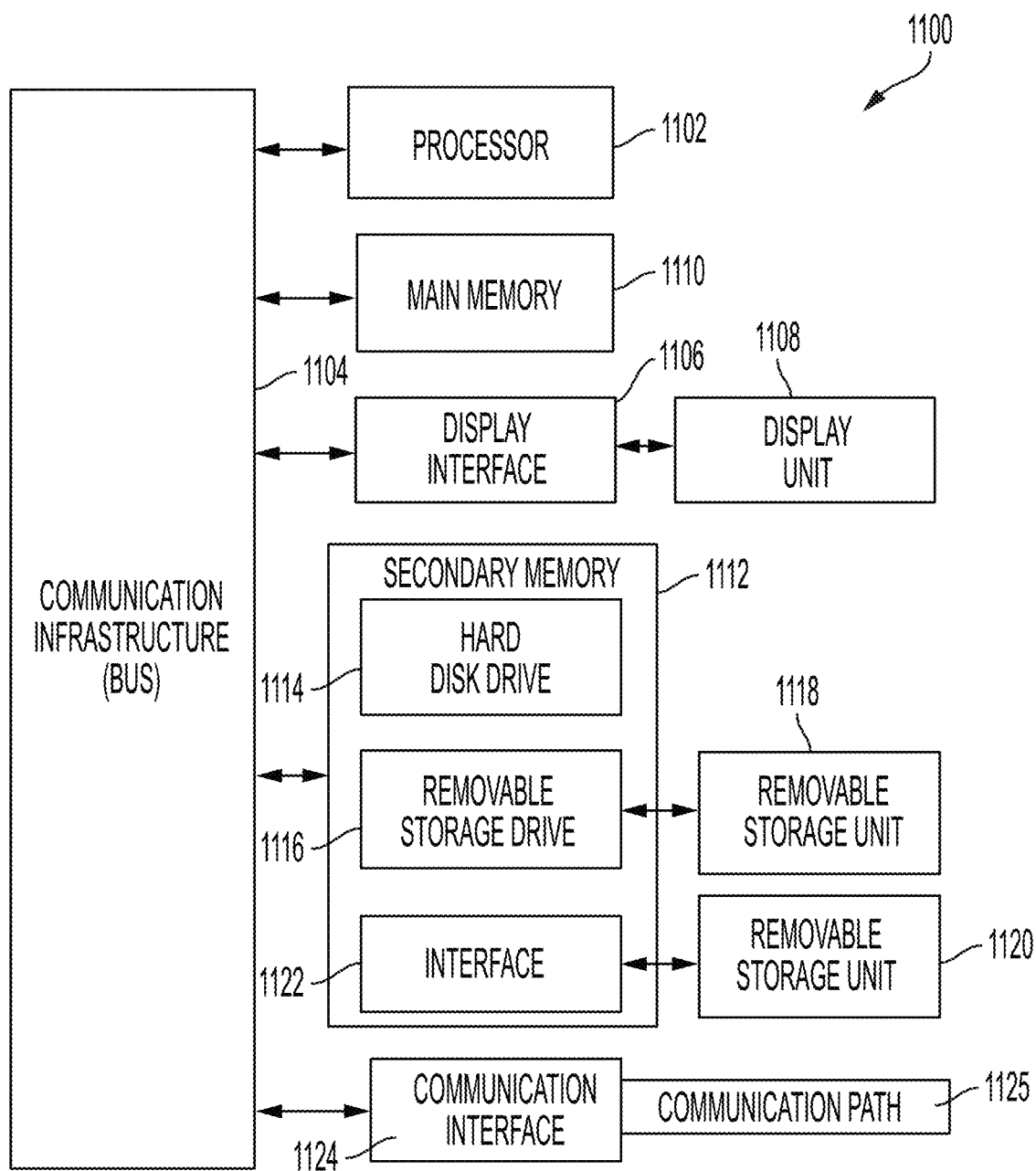
FIG. 11 depicts details of an exemplary computing system capable of implementing various aspects of the invention.

The classifier 910 can be implemented as algorithms executed by a programmable computer such as a processing system 1100 (shown in FIG. 11). As shown in FIG. 9, the classifier 910 includes a suite of machine learning (ML) algorithms 912; natural language processing (NLP) algorithms 914; and model(s) 916 that are relationship (or prediction) algorithms generated (or learned) by the ML algorithms 912. The algorithms 912, 914, 916 of the classifier 910 are depicted separately for ease of illustration and explanation. In embodiments of the invention, the functions performed by the various algorithms 912, 914, 916 of the classifier 910 can be distributed differently than shown. For example, where the classifier 910 is configured to perform an overall task having sub-tasks, the suite of ML algorithms 912 can be segmented such that a portion of the ML algorithms 912 executes each sub-task and a portion of the ML algorithms 912 executes the overall task. Additionally, in some embodiments of the invention, the NLP algorithms 914 can be integrated within the ML algorithms 912.

The NLP algorithms 914 include speech recognition functionality that allows the classifier 910, and more specifically the ML algorithms 912, to receive natural language data (text and audio) and apply elements of language processing, information retrieval, and machine learning to derive meaning from the natural language inputs and potentially take action based on the derived meaning. The NLP algorithms 914 used in accordance with aspects of the invention can also include speech synthesis functionality that allows the classifier 910 to translate the result(s) 920 into natural language (text and audio) to communicate aspects of the result(s) 920 as natural language communications.

The NLP and ML algorithms 914, 912 receive and evaluate input data (i.e., training data and data-under-analysis) from the data sources 902. The ML algorithms 912 includes functionality that is necessary to interpret and utilize the input data's format. For example, where the data sources 902 include image data, the ML algorithms 912 can include visual recognition software configured to interpret image data. The ML algorithms 912 apply machine learning techniques to received training data (e.g., data received from one or more of the data sources 902) in order to, over time, create/train/update one or more models 916 that model the overall task and the sub-tasks that the classifier 910 is designed to complete.

Figure 10:
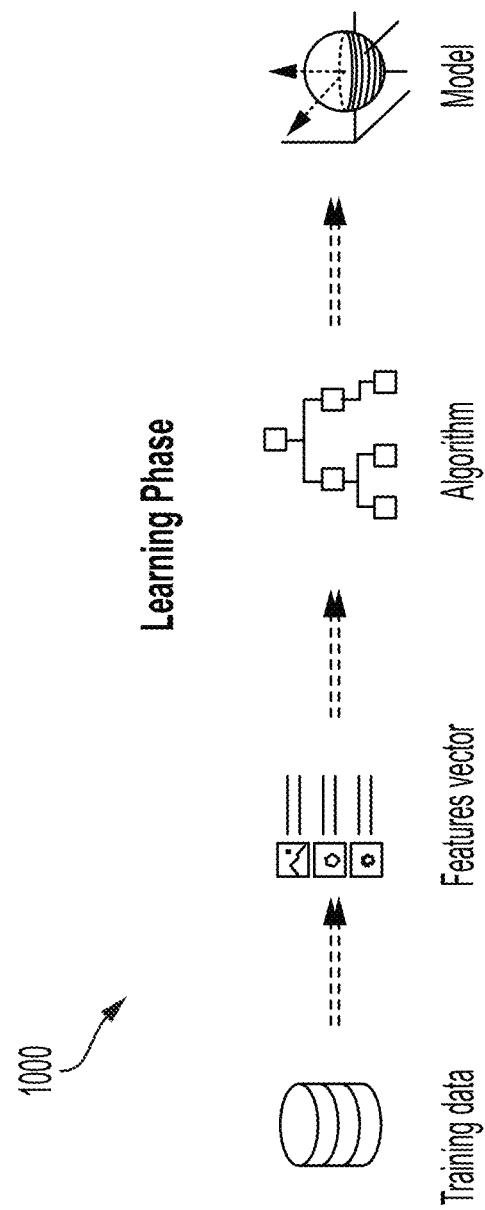
FIG. 10 depicts a learning phase that can be implemented by the machine learning system shown in FIG. 9.

Referring now to FIGS. 9 and 10 collectively, FIG. 10 depicts an example of a learning phase 1000 performed by the ML algorithms 912 to generate the above-described models 916. In the learning phase 1000, the classifier 910 extracts features from the training data and coverts the features to vector representations that can be recognized and analyzed by the ML algorithms 912. The features vectors are analyzed by the ML algorithm 912 to "classify" the training data against the target model (or the model's task) and uncover relationships between and among the classified training data. Examples of suitable implementations of the ML algorithms 912 include but are not limited to neural networks, support vector machines (SVMs), logistic regression, decision trees, hidden Markov Models (HMIs), etc. The learning or training performed by the ML algorithms 912 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 910 and the ML algorithms 912. Unsupervised learning can utilize additional learning/training methods including, for example, clustering, anomaly detection, neural networks, deep learning, and the like.

When the models 916 are sufficiently trained by the ML algorithms 912, the data sources 902 that generate "real world" data are accessed, and the "real world" data is applied to the models 916 to generate usable versions of the results 920. In some embodiments of the invention, the results 920 can be fed back to the classifier 910 and used by the ML algorithms 912 as additional training data for updating and/or refining the models 916.

In aspects of the invention, the ML algorithms 912 and the models 916 can be configured to apply confidence levels (CLs) to various ones of their results/determinations (including the results 920) in order to improve the overall accuracy of the particular result/determination. When the ML algorithms 912 and/or the models 916 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 910 can be configured to apply confidence levels (CLs) to the results 920. When the classifier 910 determines that a CL in the results 920 is below a predetermined threshold (TH) (i.e., CL<TH), the results 920 can be classified as sufficiently low to justify a classification of "no confidence" in the results 920. If CL>TH, the results 920 can be classified as sufficiently high to justify a determination that the results 920 are valid. Many different predetermined TH levels can be provided such that the results 920 with CL>TH can be ranked from the highest CL>TH to the lowest CL>TH.

The functions performed by the classifier 910, and more specifically by the ML algorithm 912, can be organized as a weighted directed graph, wherein the nodes are artificial neurons (e.g. modeled after neurons of the human brain), and wherein weighted directed edges connect the nodes. The directed graph of the classifier 910 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 910 can perform unsupervised deep-learning for executing the assigned task(s) of the classifier 910.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 910 processes data records (e.g., outputs from the data sources 902) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 910 and used to modify the weighted directed graph's weighted connections the second time around, and this feedback process continues for many iterations. In the training phase of a weighted directed graph of the classifier 910, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 11 depicts a high level block diagram of the computer system 1100, which can be used to implement one or more computer processing operations in accordance with aspects of the present invention. Although one exemplary computer system 1100 is shown, computer system 1100 includes a communication path 1125, which connects computer system 1100 to additional systems (not depicted) and can include one or more wide area networks (WANs) and/or local area networks (LANs) such as the Internet, intranet(s), and/or wireless communication network(s). Computer system 1100 and the additional systems are in communication via communication path 1125, e.g., to communicate data between them.

Computer system 1100 includes one or more processors, such as processor 1102. Processor 1102 is connected to a communication infrastructure 1104 (e.g., a communications bus, cross-over bar, or network). Computer system 1100 can include a display interface 1106 that forwards graphics, text, and other data from communication infrastructure 1104 (or from a frame buffer not shown) for display on a display unit 1108. Computer system 1100 also includes a main memory 1110, preferably random access memory (RAM), and can also include a secondary memory 1112. Secondary memory 1112 can include, for example, a hard disk drive 1114 and/or a removable storage drive 1116, representing, for example, a floppy disk drive, a magnetic tape drive, or an optical disk drive. Removable storage drive 1116 reads from and/or writes to a removable storage unit 1118 in a manner well known to those having ordinary skill in the art. Removable storage unit 1118 represents, for example, a floppy disk, a compact disc, a magnetic tape, or an optical disk, flash drive, solid state memory, etc. which is read by and written to by removable storage drive 1116. As will be appreciated, removable storage unit 1118 includes a computer readable medium having stored therein computer software and/or data.

In alternative embodiments of the invention, secondary memory 1112 can include other similar means for allowing computer programs or other instructions to be loaded into the computer system. Such means can include, for example, a removable storage unit 1120 and an interface 1122. Examples of such means can include a program package and package interface (such as that found in video game devices), a removable memory chip (such as an EPROM, or PROM) and associated socket, and other removable storage units 1120 and interfaces 1122 which allow software and data to be transferred from the removable storage unit 1120 to computer system 1100.

Computer system 1100 can also include a communications interface 1124. Communications interface 1124 allows software and data to be transferred between the computer system and external devices. Examples of communications interface 1124 can include a modem, a network interface (such as an Ethernet card), a communications port, or a PCM-CIA slot and card, etcetera. Software and data transferred via communications interface 1124 are in the form of signals which can be, for example, electronic, electromagnetic, optical, or other signals capable of being received by communications interface 1124. These signals are provided to communications interface 1124 via communication path (i.e., channel) 1125. Communication path 1125 carries signals and can be implemented using wire or cable, fiber optics, a phone line, a cellular phone link, an RF link, and/or other communications channels.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments of the invention only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of generating a pathway recommendation, the computer-implemented method comprising:
   using a processor system to generate an intermediate three-dimensional (3D) virtual reality (VR) environment of a target environment;
   using a machine learning algorithm to perform a machine learning task on the intermediate 3D VR environment to generate machine learning task results comprising predicted features of interest (FOI) and FOI annotations for the intermediate 3D VR environment;
   using the processor system to generate, based at least in part on the machine learning task results, the pathway recommendation:
   generating an immersive 3D VR environment comprising the intermediate 3D VR environment integrated with the pathway recommendation; and
   presenting the immersive 3D VR environment to a user such that the pathway recommendation of the immersive 3D VR environment operates as a recommendation for the user to follow the pathway recommendation.

2. The computer-implemented method of claim 1, wherein:
   the recommendation for the user to follow the pathway recommendation assists the user with navigating and interpreting the immersive 3D VR environment comprising the intermediate 3D VR environment integrated with the pathway recommendation; and
   the processor system enables the user to not follow the pathway recommendation and navigate through a portion of the immersive 3D VR environment that is outside the pathway recommendation.

3. The computer-implemented method of claim 1 further comprising using the processor system to generate the pathway recommendation based at least in part on:

a user profile data; and
a user task to be performed by the user on the immersive 3D VR environment.

4. The computer-implemented method of claim 1 further comprising using the processor system to generate, based at least in part on user feedback data, the pathway recommendation, wherein the user feedback data comprises feedback the processor system receives from the user about the pathway recommendation while the user is being guided through the immersive 3D VR environment by the pathway recommendation.

5. The computer-implemented method of claim 1, wherein the pathway recommendation comprises pathway guidance comprising a communication generated by the processor system and provided to the user to guide the user through the pathway recommendation.

6. The computer-implemented method of claim 1, wherein the pathway recommendation comprises a point-of-interest (POI) pattern comprising a grouping of points of interest of the pathway recommendation, wherein the grouping conveys information to the user that is relevant to the user task.

7. The computer-implemented method of claim 1, wherein the machine learning algorithm has been trained to perform the machine learning task using a historical target environment analysis corpus comprising information from prior analyses performed by trained interpreters on other target environments.

8. A computer system comprising a processor communicatively coupled to a memory, wherein the processor performs processor operations comprising:
  generating an intermediate three-dimensional (3D) virtual reality (VR) environment of a target environment;
  using a machine learning algorithm to perform a machine learning task on the intermediate 3D VR environment to generate machine learning task results comprising predicted features of interest (FOI) and FOI annotations for the intermediate 3D VR environment;
  generating, based at least in part on the machine learning task results, a pathway recommendation;
  generating an immersive 3D VR environment comprising the intermediate 3D VR environment integrated with the pathway recommendation; and
  presenting the immersive 3D VR environment to a user such that the pathway recommendation of the immersive 3D environment operates as a recommendation for the user to follow the pathway recommendation.

9. The computer system of claim 8, wherein:
  the recommendation for the user to follow the pathway recommendation assists the user with navigating and interpreting the immersive 3D VR environment comprising the intermediate 3D VR environment integrated with the pathway recommendation; and
  the processor operations include enabling the user to not follow the pathway recommendation and navigate through a portion of the immersive 3D VR environment that is outside the pathway recommendation.

10. The computer system of claim 8, wherein the processor operations further comprise generating the pathway recommendation based at least in part on:
  a user profile data; and
  a user task to be performed by the user on the immersive 3D VR environment.

11. The computer system of claim 8, wherein the processor operations further comprise generating, based at least in part on user feedback data, the pathway recommendation, wherein the user feedback data comprises feedback the processor system receives from the user about the pathway recommendation while the user is being guided through the immersive 3D VR environment by the pathway recommendation.

12. The computer system of claim 8, wherein the pathway recommendation comprises pathway guidance comprising a communication generated by the processor system and provided to the user to guide the user through the pathway recommendation.

13. The computer system of claim 8, wherein the pathway recommendation comprises a point-of-interest (POI) pattern comprising a grouping of points of interest of the pathway recommendation, wherein the grouping conveys information to the user that is relevant to the user task.

14. The computer system of claim 8, wherein the machine learning algorithm has been trained to perform the machine learning task using a historical target environment analysis corpus comprising information from prior analyses performed by trained interpreters on other target environments.

15. A computer program product for generating a pathway recommendation, the computer program product comprising a computer readable program stored on a computer readable storage medium, wherein the computer readable storage medium is not a transitory signal per se, wherein the computer readable program, when executed on a processor system, causes the processor system to perform a processor operations comprising:
  generating an intermediate three-dimensional (3D) virtual reality (VR) environment of a target environment;
  using a machine learning algorithm to perform a machine learning task on the intermediate 3D VR environment to generate machine learning task results comprising predicted features of interest (FOI) and FOI annotations for the intermediate 3D VR environment;
  generating, based at least in part on the machine learning task results, a pathway recommendation;
  generating an immersive 3D VR environment comprising the intermediate 3D VR environment integrated with the pathway recommendation; and
  presenting the immersive 3D VR environment to a user such that the pathway recommendation of the 3D VR environment operates as a recommendation for the user to follow the pathway recommendation.

16. The computer program product of claim 15, wherein:
  the recommendation for the user to follow the pathway recommendation assists the user with navigating and interpreting the immersive 3D VR environment comprising the intermediate 3D VR environment integrated with the pathway recommendation; and
  the processor operations include enabling the user to not follow the pathway recommendation and navigate through a portion of the immersive 3D VR environment that is outside the pathway recommendation.

17. The computer program product of claim 15, wherein the processor operations further comprise generating the pathway recommendation based at least in part on:
  a user profile data; and
  a user task to be performed by the user on the immersive 3D VR environment.

18. The computer program product of claim 15, wherein the processor operations further comprise generating, based at least in part on user feedback data, the pathway recommendation, wherein the user feedback data comprises feedback the processor system receives from the user about the pathway recommendation while the user is being guided through the immersive 3D VR environment by the pathway recommendation.

19. The computer program product of claim 15, wherein the pathway recommendation comprises:
- pathway guidance comprising a communication generated by the processor system and provided to the user to guide the user through the pathway recommendation; and
- a point-of-interest (POI) pattern comprising a grouping of points of interest of the pathway recommendation, wherein the grouping conveys information to the user that is relevant to the user task.

20. The computer program product of claim 15, wherein the machine learning algorithm has been trained to perform the machine learning task using a historical target environment analysis corpus comprising information from prior analyses performed by trained interpreters on other target environments.

* * * * *